(12) United States Patent
Suginaka et al.

(10) Patent No.: US 7,930,575 B2
(45) Date of Patent: Apr. 19, 2011

(54) MICROCONTROLLER FOR CONTROLLING POWER SHUTDOWN PROCESS

(75) Inventors: Yukari Suginaka, Osaka (JP); Toshifumi Hamaguchi, Osaka (JP); Yoshitaka Kitao, Kyoto (JP); Shinya Muramatsu, Hyogo (JP)

(73) Assignee: Panasonic Corporation, Osaka (JP)

( * ) Notice: Subject to any disclaimer, the term of this patent is extended or adjusted under 35 U.S.C. 154(b) by 856 days.

(21) Appl. No.: 11/898,145

(22) Filed: Sep. 10, 2007

(65) Prior Publication Data

US 2008/0065920 A1   Mar. 13, 2008

(30) Foreign Application Priority Data

Sep. 12, 2006   (JP) .................................. 2006-246454

(51) Int. Cl.
*G06F 1/26* (2006.01)
(52) U.S. Cl. .................... 713/324; 713/300; 713/323
(58) Field of Classification Search ............... 713/324
See application file for complete search history.

(56) References Cited

U.S. PATENT DOCUMENTS

| | | | | |
|---|---|---|---|---|
| 5,379,435 A | * | 1/1995 | Hanaoka | 713/2 |
| 5,978,922 A | * | 11/1999 | Arai et al. | 713/323 |
| 6,535,982 B1 | * | 3/2003 | Kawabe et al. | 713/300 |
| 7,103,758 B2 | | 9/2006 | Goto | |
| 7,167,991 B2 | * | 1/2007 | Higashida | 713/320 |
| 7,380,149 B2 | * | 5/2008 | Ozawa et al. | 713/324 |
| 7,430,677 B2 | * | 9/2008 | Hada | 713/323 |
| 7,730,330 B1 | * | 6/2010 | Fleischmann et al. | 713/300 |
| 2003/0097510 A1 | * | 5/2003 | Joseph | 710/305 |
| 2004/0257898 A1 | | 12/2004 | Ozawa et al. | |
| 2006/0198227 A1 | * | 9/2006 | Okada | 365/229 |

FOREIGN PATENT DOCUMENTS

| | | |
|---|---|---|
| JP | 58-169218 | 10/1983 |
| JP | 61-182123 | 8/1986 |
| JP | 63-298654 | 12/1988 |
| JP | 06-124150 | 5/1994 |
| JP | 06-161617 | 6/1994 |
| JP | 11-259376 | 9/1999 |
| JP | 2002-288150 | 10/2002 |
| JP | 2004-030100 | 1/2004 |

* cited by examiner

*Primary Examiner* — Nitin C Patel
(74) *Attorney, Agent, or Firm* — McDermott Will & Emery LLP

(57) ABSTRACT

A power supply unit is arranged between a CPU and a power supply device for supplying power to the CPU. Information necessary in proceeding with a program is evacuated from the CPU to an information holding unit. When a power shutdown factor is generated, a power supply control unit outputs a shutdown request signal to the CPU. The CPU, upon receiving the shutdown request signal, activates a power shutdown microprogram, evacuates the information necessary in proceeding with the program to the information holding unit, and outputs an evacuation completed signal to the power supply control unit after the evacuation is completed. Upon receiving the evacuation completed signal, the power supply control unit outputs a power shutdown control signal to the power supply unit. Upon receiving the power shutdown control signal from the power supply control unit, the power supply unit shuts down power supply to the CPU.

31 Claims, 24 Drawing Sheets

F I G. 2
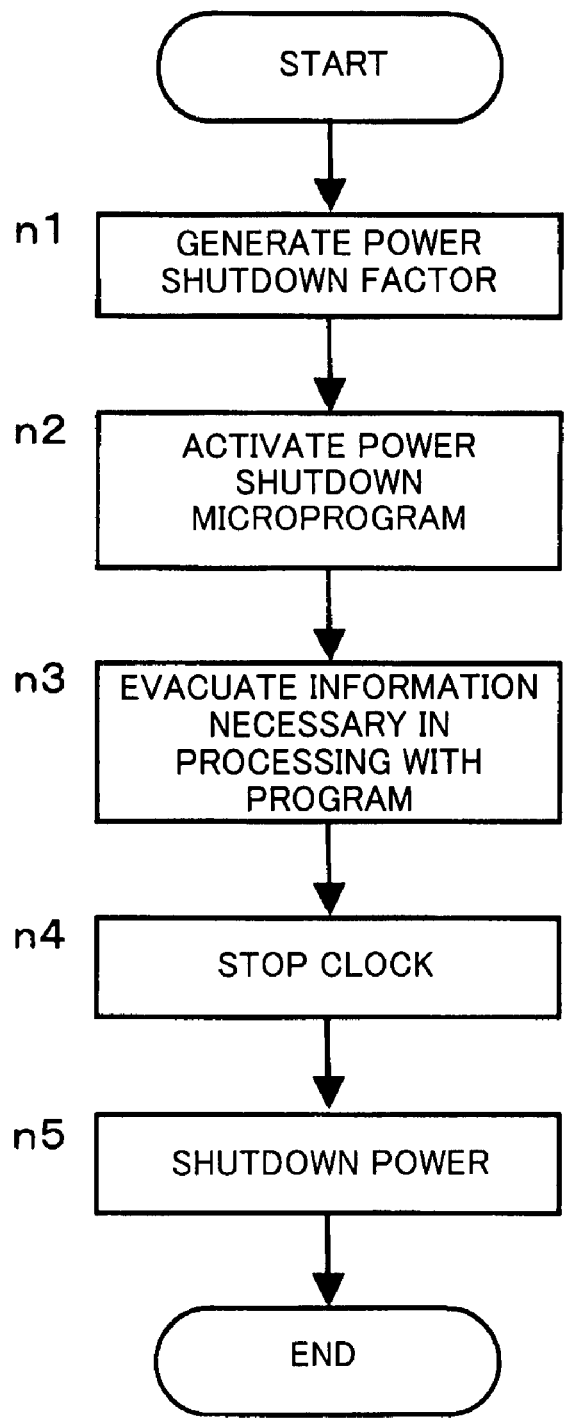

F I G. 4
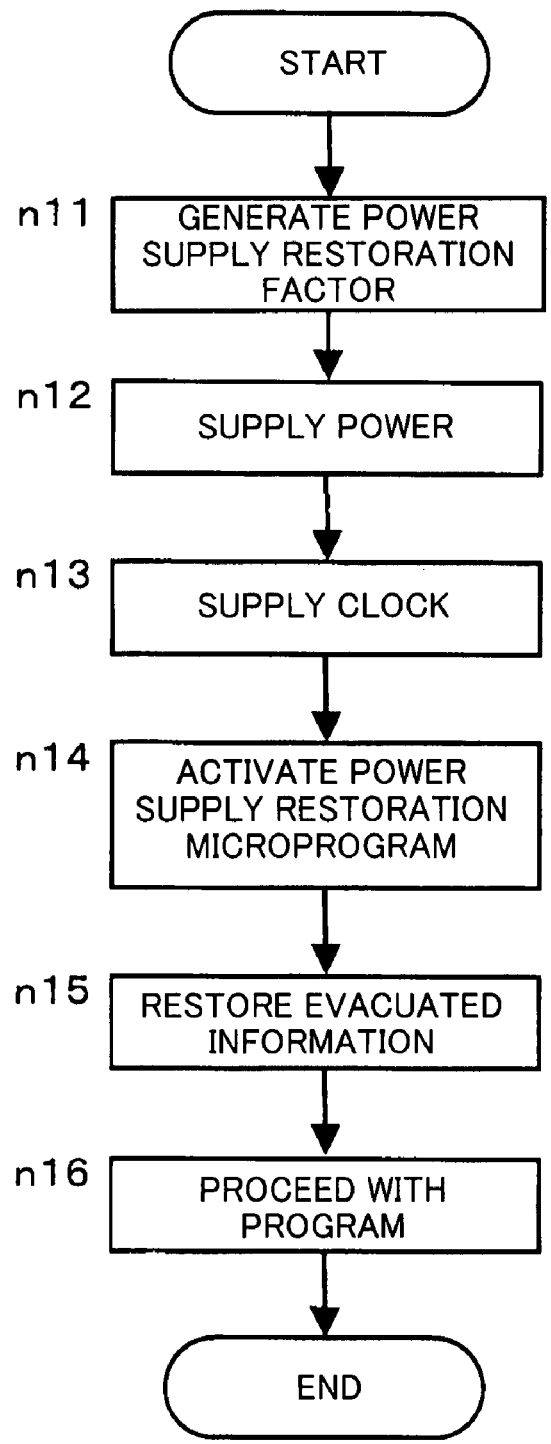

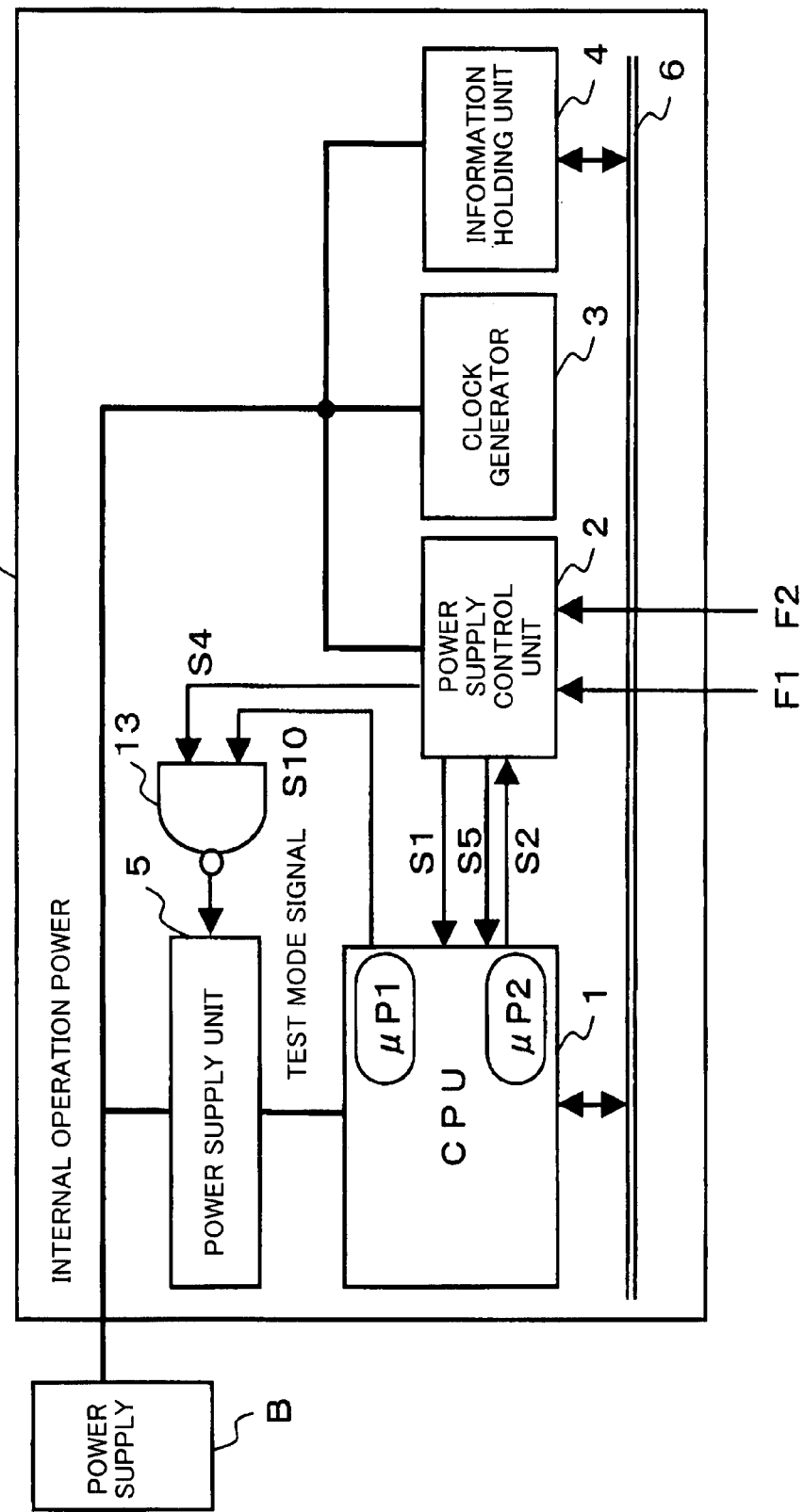

F I G. 1 5
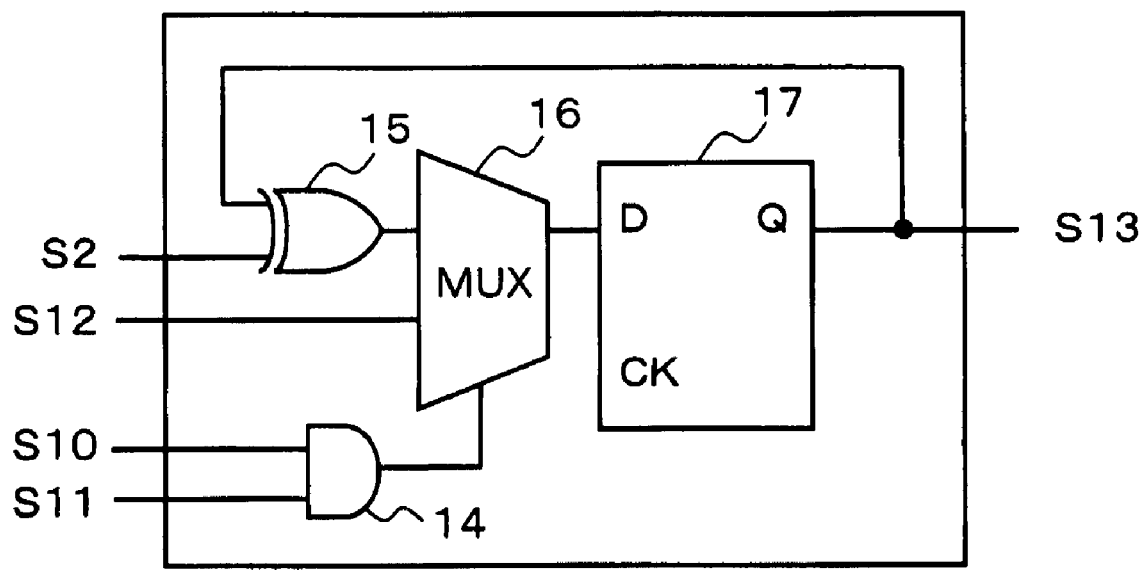

F I G. 1 8
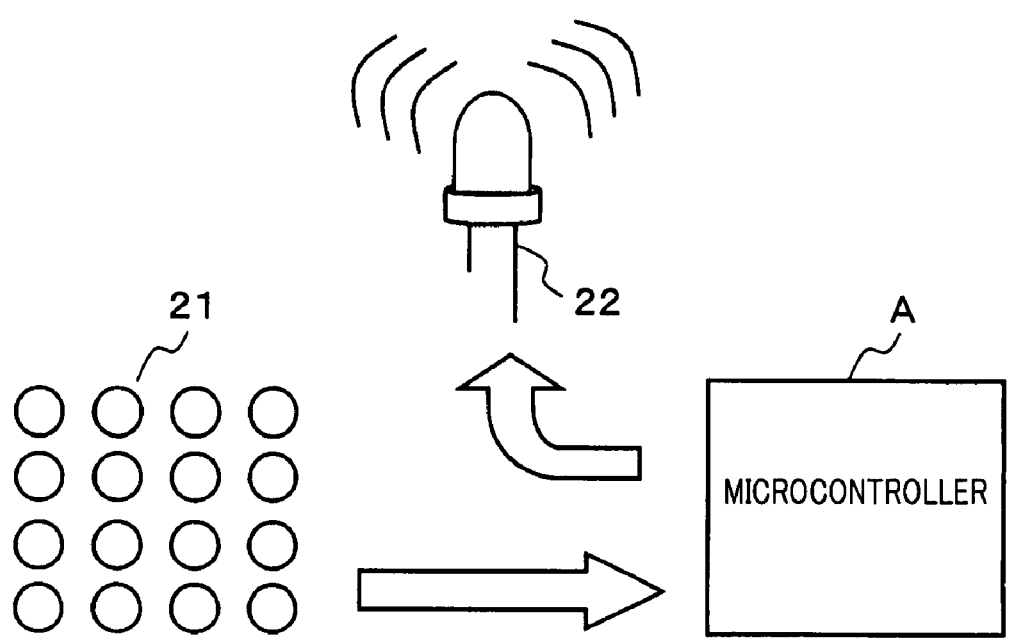

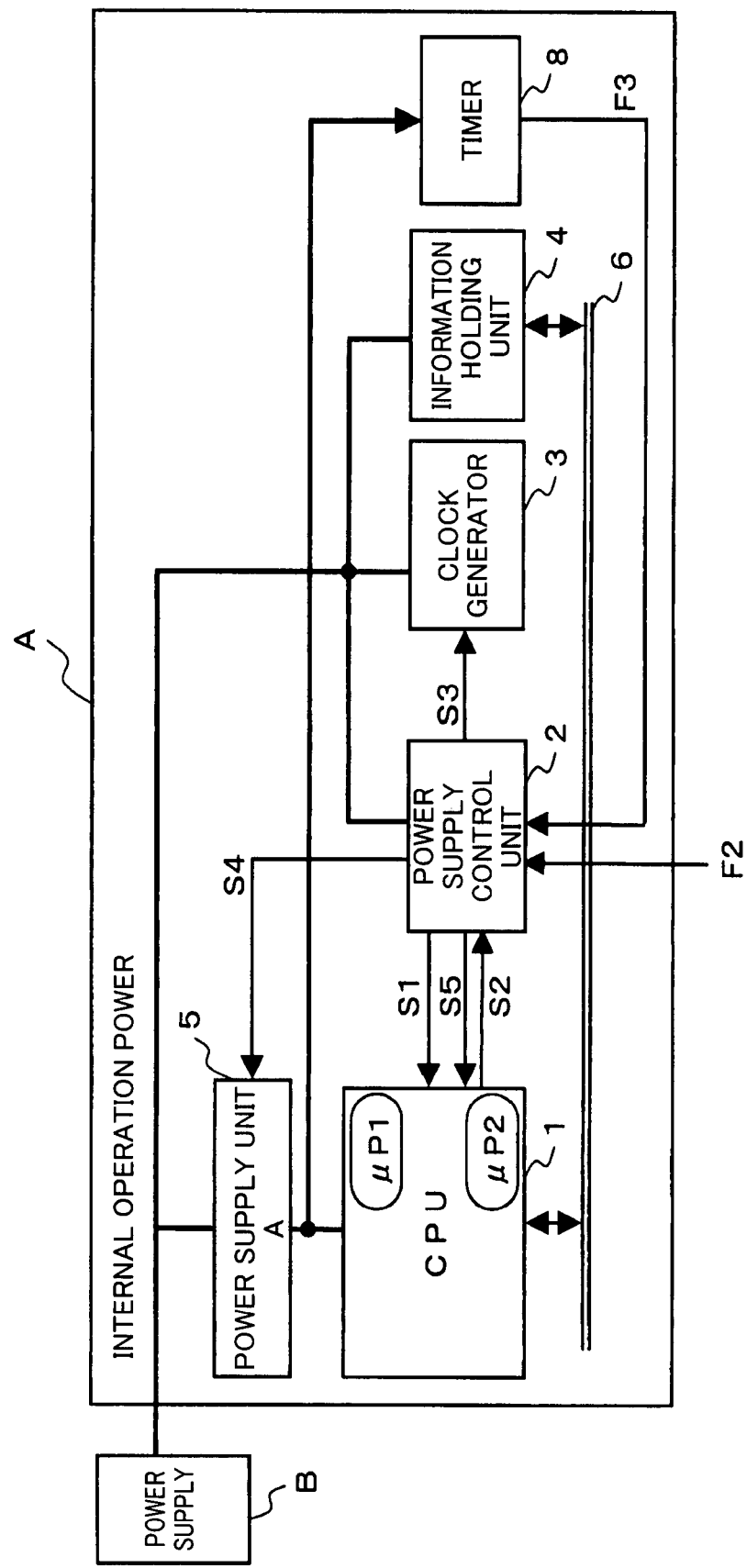

F I G. 2 2
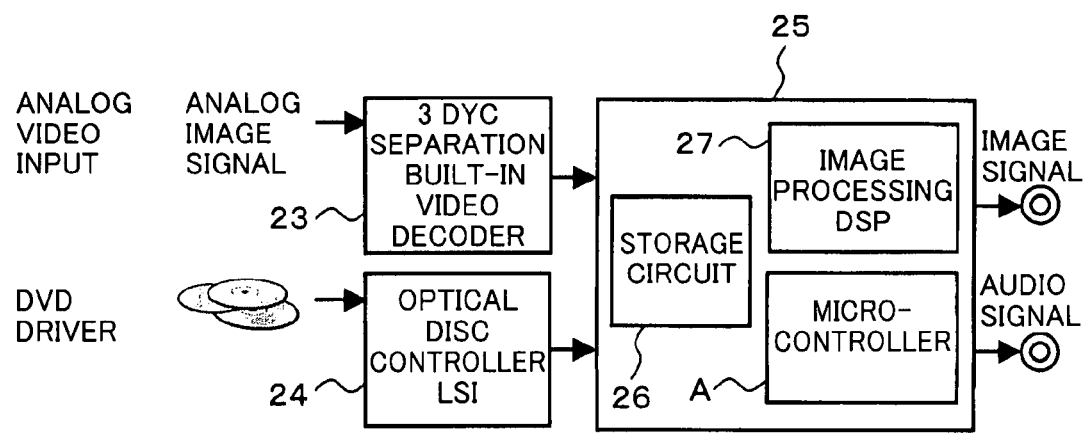

MICROCONTROLLER FOR CONTROLLING POWER SHUTDOWN PROCESS

RELATED APPLICATION

This application claims foreign priority of Japanese Patent Application No. 2006-246454 filed on Sep. 12, 2006 under 35 U.S.C. §119.

BACKGROUND OF THE INVENTION

1. Field of the Invention

The present invention relates to microcontrollers, and in particular, to a technique of suppressing current consumption in time of stand-by in a power shutdown mode in which a program can proceed. This technique is also applicable to a communication device and a recording device.

2. Description of the Related Art

A general microcontroller has a stop mode for stopping supply of a operation clock and reducing current consumption as a standby mode, which is one of the operation modes. In the stop mode, start-up etc. of the software does not need to be performed since the internal state is maintained, and high speed restoration from the standby state is possible. However, as circuits are being configured with microscopic transistors due to advancement in recent semiconductor manufacturing techniques, the OFF current (leakage current) of the transistor is in great amount, and the current consumption even in the stop mode tends to be large.

The current consumption caused by leakage current is made to substantially zero in a method of shutting down power to suppress the current consumption. In this case, since the internal state of the microcontroller is destroyed due to power shutdown, the initialization program must be executed from the reset process in order to initialize the inside. However, if such process is executed, the initial setting of the microcontroller and the start-up of the operating system are performed, whereby the time required for restoration becomes longer.

A power shutdown mode for allowing a program to proceed was thus developed. Related arts include a technique in which a standby control circuit is arranged proposed in a Japanese Laid-Open Patent Publication (Japanese Laid-Open Patent Publication No. 2005-11166). This technique performs a control to continue power supply to an information holding circuit for holding the value of a register contained in a peripheral circuit module when shutting down power supply to a CPU (Central Processing Unit) and the peripheral circuit module. In such control, when an interrupt request is notified from outside the device, the power supply to the CPU and the peripheral circuit module is resumed, and the evacuated information is restored to the CPU and the peripheral circuit module. Returning again to the execution of the program, an interrupt processing corresponding to the interrupt request is performed. According to such a configuration, the reduction in standby current by power shutdown and high-speed restoration from standby by interrupt both can be obtained.

In the technique of the standby control circuit, after prohibiting interruption, the value of the register to be necessary in the software is evacuated, and the power is shutdown while prohibiting interruption. This process is performed because there is a possibility that the evacuated register value may change before the power shutdown if interrupt is accepted before the power shutdown.

However, in the technique of the standby control circuit, if the power supply is shutdown with the interruption for restoration occurring while prohibiting interruption, restoration may not be possible unless interrupt reoccurs, the interrupt processing is performed after executing the power shutdown process and the power supply process, and the delay time from the occurrence of interrupt until the execution of the actual process becomes long, and the temporal anteroposterior relationship of the power supply process and the interrupt processing may reverse.

Furthermore, in the technique of the standby control circuit, the backup register and the register to be evacuated are directly connected by way of a logic circuit as the information holding means.

However,
the backup registers of the number equivalent to the number of registers to be evacuated are necessary; and
wirings double the number of registers to be evacuated are necessary.

Since the wiring is the portion connecting the portion of shutting down power and the portion of continuously supplying the power, a logic circuit for preventing unnecessary current from flowing and a logic circuit for preventing destruction of information are required, whereby the circuit scale is increased.

SUMMARY OF THE INVENTION

Therefore, it is a main object of the present invention to provide a microcontroller capable of easily and rapidly evacuating and restoring information necessary in proceeding with a program when realizing a standby state in which internal operation voltage supply is shutdown, a state in which an internal operation voltage is lowered, or the like.

(1) A microcontroller according to the present invention includes:
a CPU;
a power supply device for supplying power to the CPU;
a power supply unit arranged between the CPU and the power supply device;
a power supply control unit for controlling the CPU and the power supply unit; and
an information holding unit for holding information evacuated from the CPU, the information necessary in proceeding with a program; wherein
the power supply control unit outputs a shutdown request signal to the CPU in response to generation of a power shutdown factor,
the CPU, upon receiving the shutdown request signal, activates a power shutdown microprogram, evacuates the information necessary in proceeding with the program to the information holding unit, and outputs an evacuation completed signal to the power supply control unit after evacuation is completed,
the power supply control unit, upon receiving the evacuation completed signal, outputs a power shutdown control signal to the power supply unit, and
the power supply unit shuts down power supply to the CPU upon receiving the power shutdown control signal from the power supply control unit.

In the present invention, when the power shutdown factor is generated, the power supply control unit outputs the shutdown request signal to the CPU. The CPU, upon receiving the shutdown request signal activates the power shutdown microprogram. The power shutdown microprogram evacuates the information necessary in proceeding with the program to the information holding unit, and then outputs the evacuation completed signal to the power supply control unit. The power supply control unit, upon receiving the evacuation completed signal outputs the power shutdown control signal to the power supply unit, and the power supply unit in turn, shuts down power supply to the CPU. However, the power supply unit continues to supply power to the information holding unit. Thus, the CPU will be in a stopped state and the current consumption will be suppressed. The information necessary in proceeding with the program will also be held.

The power shutdown microprogram continuously executes evacuation of the information necessary in proceeding with the program and the power shutdown process, and thus no interrupt processing will be activated between the information evacuating process and the power shutdown process. Thus, the information necessary in proceeding with the program to be evacuated is prevented from being changed before the power shutdown. Furthermore, the interrupt does not need to be prohibited before the information evacuation or the power shutdown process. Accordingly, the power shutdown process in an interrupt permitted state, and acceptance of interrupt processing before the power shutdown can be executed. Since the evacuation of the information is executed by the microprogram, the data can be evacuated using existing wirings of the microcontroller, and increase in the number of logic circuits and wirings dedicated for evacuating information is suppressed to a minimum.

(2) The microcontroller according to the present invention has an aspect of further including a clock generator; wherein the power supply control unit, upon receiving the evacuation completed signal outputs a clock stop control signal to the clock generator.

In this aspect, the power shutdown microprogram stops the operation of the clock generator after evacuation of the information necessary in proceeding with the program and the power shutdown process are completed, and thus current consumption in the peripheral circuit module that operates in response to the clock supply from the clock generator is suppressed.

(3) The microcontroller according to the present invention has an aspect where the power supply control unit outputs a power supply control signal to the power supply unit in response to generation of a power supply restoration factor;

the power supply unit, upon receiving the power supply control signal, starts to supply power to the CPU;

the power supply control unit outputs a restoration request signal to the CPU and outputs a clock supply control signal to the clock generator when a supplied power supply voltage is stabilized;

the clock generator, upon receiving the clock supply control signal, restarts to supply an operation clock; and the CPU, upon receiving the restoration request signal, activates a power supply restoration microprogram, restores the information necessary in proceeding with the program and evacuated in the information holding unit in time of power shutdown, and ultimately branches processes to addresses indicated by a program counter to change from a shutdown state to a program execution state and proceed with the program.

In this aspect, when the power supply restoration factor is generated in the state of shutting down power supply to the CPU and in the state of stopping clock supply by the clock generator, the power supply control unit outputs the power supply control signal to the power supply unit. The power supply unit, upon receiving the power supply control signal, starts to supply power to the CPU. When the power supply voltage to be supplied is stabilized, the power supply control unit outputs the restoration request signal to the CPU and also outputs the clock supply control signal to the clock generator. In response to such signals, the clock generator restarts to supply the operation clock, and the CPU activates the power supply restoration microprogram. The power supply restoration microprogram restores the information necessary in proceeding with the program and evacuated in the information holding unit to the CPU, and then branches the processes to the addresses indicated by the program counter to continue the program execution from the shutdown state. Therefore, according to such a configuration, restoration of the evacuated information necessary in proceeding with the program is easily and conveniently achieved.

(4) The microcontroller according to the present invention includes:

a CPU;

a power supply device for supplying power to the CPU;

a power supply unit arranged between the CPU and the power supply device;

a power supply control unit for controlling the CPU and the power supply unit; and an information holding unit for holding information evacuated from the CPU, the information necessary in proceeding with a program; wherein the power supply control unit outputs a shutdown request signal to the CPU in response to generation of a power shutdown factor, the CPU, upon receiving the shutdown request signal, activates a power shutdown microprogram, evacuates the information necessary in proceeding with the program to the information holding unit, and outputs an evacuation completed signal to the power supply control unit after evacuation is completed, the power supply control unit, upon receiving generation of a power supply restoration factor after receiving the evacuation completed signal, outputs a restoration request signal to the CPU, and the CPU, upon receiving the restoration request signal, activates a power supply restoration microprogram of not restoring the evacuated information, and continues program execution.

In this aspect, since interrupt prohibition is not performed in the execution of the power shutdown microprogram, the activation of the power supply restoration microprogram for not restoring the evacuated information can be performed based on the generation of the power supply restoration factor. When the power supply restoration factor is generated before the power supply is shutdown after activating the power shutdown microprogram, the power supply restoration microprogram for not restoring the evacuated information is activated. In this case, restoration is performed at high speed since the evacuated information is not restored.

(5) The microcontroller according to the present invention has an aspect where the clock generator selects one of operation performed after stopping supply of an operation clock and operation stop performed without stopping the supply of the operation clock as operation to be performed upon receiving the clock stop control signal from the power supply control unit.

In such a configuration, the operation according to user preference can be set by mode selection. In the case of a mode in which the supply of the operation clock is not stopped, restoration can be carried out at an arbitrary time by moving a counter of a timer or in any other methods.

(6) The microcontroller according to the present invention has an aspect where the power supply control unit limits a period in which shutdown is possible. In this aspect, a shutdown possible period is set in the register in the power control unit, where the power shutdown factor is accepted if within the period, and not accepted if outside the period. Thus, the operation mode is diversified.

(7) The microcontroller according to the present invention has an aspect where the power shutdown microprogram evacuates the information necessary in proceeding with the program to a stack region in the information holding unit and then evacuates to a specific place only a value of a stack pointer for pointing to an evacuation place. The information necessary in proceeding with the program includes a program counter, processor status word, stack pointer, and the like.

In this aspect, most of the information necessary in proceeding with the program is evacuated to the stack region in the information holding unit, and only the value of the stack pointer for pointing to the evacuation place is evacuated to a specific region, and thus a dedicated logic necessary for such an aspect is made to a minimum configuration.

(8) The microcontroller according to the present invention has an aspect where the power supply restoration factor uses an interrupt system of the microcontroller. In this aspect, the circuit does not need to be additionally formed.

(9) The microcontroller according to the present invention has an aspect where the state of the power shutdown factor includes a state where it is provided from an external terminal and a state where it is provided by a command, and it is possible to select a configuration corresponding to either one or both of the states. In this aspect, the microcontroller can be more universally applied.

(10) The microcontroller according to the present invention has an aspect where,
the power supply restoration microprogram includes:
a microprogram for restoring the evacuated information necessary in proceeding with the program and proceeding with the program;
a microprogram for restoring a set value without using the evacuated information necessary in proceeding with the program; and
a program for resetting processes, and
the CPU selects one of the plurality of microprograms in an alternative way. In this aspect, the application range can be extended by broadening the options.

(11) The microcontroller according to the present invention has an aspect of activating one of the power shutdown microprogram and the power supply restoration microprogram selected in an alternative way, according to the generated power shutdown factor or a type of the selected power shutdown factor.

The present invention enables the number of information necessary in proceeding with the program to be changed. This aspect focuses on such capability. Thus, an efficient application system can be built by executing the microprogram respectively corresponding to the number of information necessary in proceeding with the program.

(12) The microcontroller according to the present invention has an aspect where the power supply device sets a period for shutting down power supply according to one or a plurality of peripheral circuit modules, and the power shutdown period in the power supply device is set so that power shutdown is not carried out in a period necessary for power supply restoration and power shutdown is carried out in a period not necessary for the power supply restoration. According to such an aspect, the current consumption is further reduced.

(13) The microcontroller according to the present invention has an aspect of further including a debugger for constantly monitoring a register in the CPU; wherein
data other than data monitored by the debugger is evacuated in the information holding unit in time of power shutdown.

According to such an aspect, since the debugger is constantly monitoring the register in the CPU, the information to be evacuated from the CPU to the information holding unit in time of power shutdown reduces, and the speed of executing the power shutdown increases.

(14) The microcontroller according to the present invention has an aspect of further including a second power supply unit for lowering a voltage to be supplied to a circuit portion outside a power shutdown range to a lower limit voltage for information holding when the power shutdown factor is generated.

In this aspect, power is saved by lowering the leakage current in the information holding unit and other logic circuits outside the power shutdown range.

(15) The microcontroller according to the present invention has an aspect of further including a circuit for loading an inverted value to a register in a circuit portion in a power shutdown range.

In this aspect, a test can be realized with the same conditions as in shutdown with the power turned ON when performing the test of the power shutdown. Thus, the test time is reduced.

(16) With regard to the microcontroller according to the present invention, a communication device is configured by
the microcontroller;
an input unit for accepting an instruction to be externally input; and
a signal transmitting unit for transmitting a signal to other equipment by infrared light; wherein
a power shutdown process is executed when no input is made to the input unit for a constant time, and then a power supply restoration process is executed when an input is made to the input device.

In such a communication device, the mode changes to the power shutdown mode if input operation is not made for a constant time, and changes to the power supply restoration mode when input operation is made with such input operation as the restoration factor. Thus, significant power reduction can be expected, and advantages are provided in particular, in a long time drive of a battery driven communication device.

(17) With regard to the microcontroller according to the present invention, a recording device is configured by
a DVD recorder LSI including the microcontroller, an image processing DSP, and a storage circuit; and
an optical disc controller LSI including a DSP servo; wherein
a timer interrupt is generated to the power supply control unit at every constant time, the current time and the time a constant time before a recording programmed time are compared, and a power supply restoration process is performed, when comparison result shows that the two match, in order for the microcontroller to change to a recording processable state.

In such a recording device, significant reduction in power is achieved by setting to the power shutdown mode instead of the standby mode, which is normally set, when operation is not made before the recording programmed time.

According to the present invention, evacuation of the information necessary in proceeding with the program and the power shutdown process are continuously executed using the power shutdown microprogram, and thus the interrupt processing does not need to be activated between the evacuation of the information and the power shutdown process, and the information necessary in proceeding with the program to be evacuated is prevented from changing before the power shutdown. Thus, high speed register evacuation and restoration are easily and efficiently realized. Since the evacuation of the information is executed by the microprogram, evacuation can be carried out using existing wirings, and increase in the number of logic circuits and wirings dedicated for evacuation of information is suppressed.

In the present invention, the power shutdown mode in which the program can proceed is realized when realizing a standby state in which the internal operation voltage supply is shutdown or in a state the internal operation voltage is lowered. Thus, the present invention is useful as a microcontroller capable of evacuating and restoring the information necessary in proceeding with the program easily and at high speed. The present invention is also useful in the communication device and the recording device.

BRIEF DESCRIPTION OF THE DRAWINGS

The invention, together with objects and advantages thereof, may best be understood by reference to the following description of the presently preferred embodiment, and are defined in the attached Claims. A great number of benefits not mentioned in the specification should be apparent to those skilled in the art by performing the present invention.

FIG. 2 is a flowchart showing the operation in a power shutdown process of the microcontroller according to the first embodiment of the present invention;

FIG. 4 is a flowchart showing the operation of a power supply restoration process of the microcontroller according to the first embodiment of the present invention;

FIG. 14 is a block diagram showing a configuration of a microcontroller according to a sixth embodiment of the present invention;

FIG. 15 is a block diagram showing detailed configuration of the inside of a CPU of the microcontroller according to the sixth embodiment of the present invention;

FIG. 18 is a schematic view of a communication device according to a seventh embodiment of the present invention;

FIG. 19 is a block diagram showing a configuration of a microcontroller according to the seventh embodiment of the present invention;

FIG. 22 is a system configuration view of a recording device according to an eighth embodiment of the present invention;

DETAILED DESCRIPTION OF THE INVENTION

Embodiments of a microcontroller according to the present invention will now be described in detail with reference to the drawings.

First Embodiment

Figure 1:
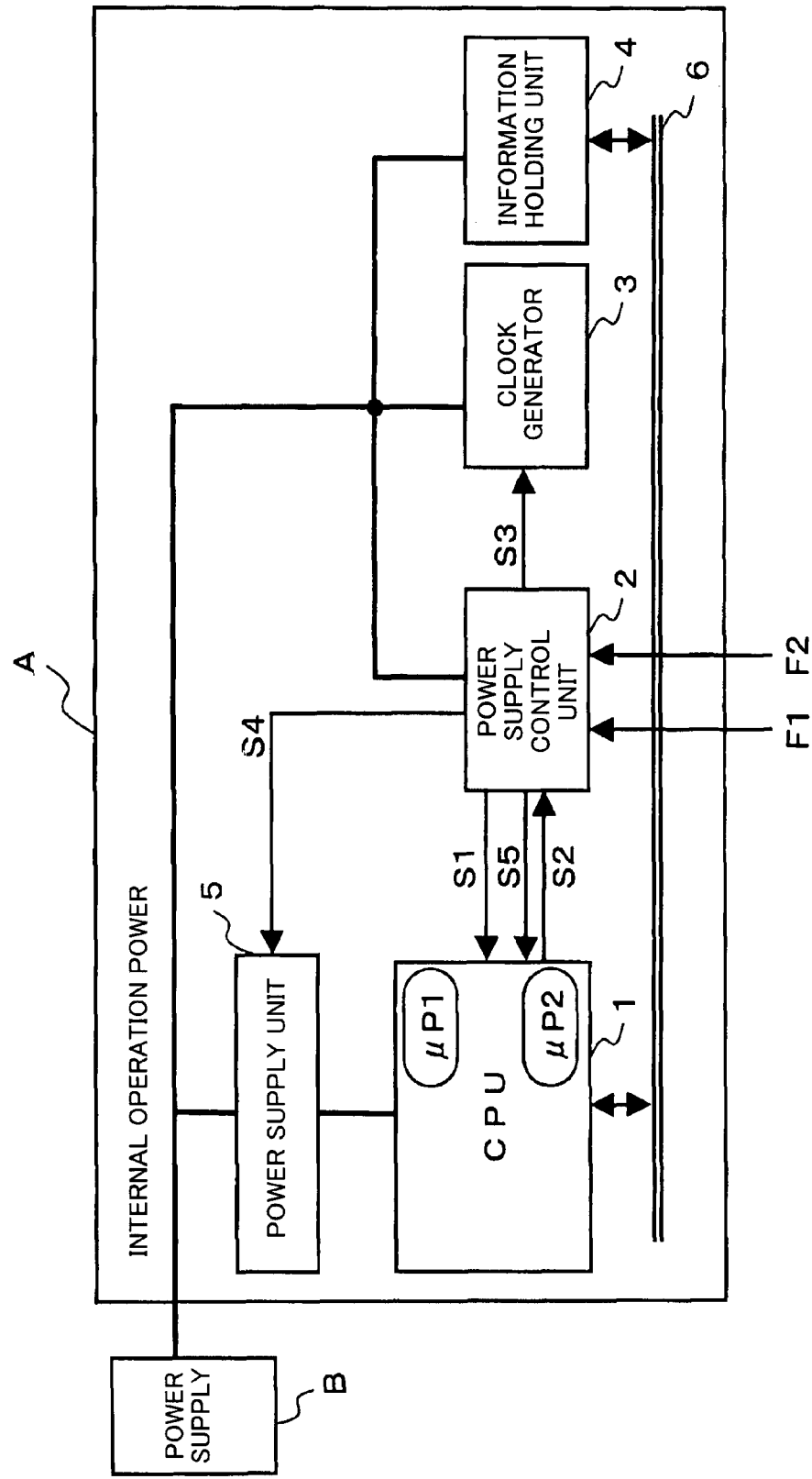
FIG. 1 is a block diagram showing a configuration of a microcontroller according to a first embodiment of the present invention.

In the first embodiment of the present invention, the present invention is applied to a configuration in which a power shutdown factor is provided from an external terminal. FIG. 1 is a block diagram showing a microcontroller A. The microcontroller A includes a CPU 1, a power supply control unit 2, a clock generator 3, an information holding unit (built-in RAM) 4, a power supply unit 5, an internal bus 6, and peripheral circuits (not shown) such as a timer circuit and serial interface. Power is externally supplied to the microcontroller A. The power supply unit 5 is arranged between the power supply B and the CPU 1, and has a function of performing a control so that the voltage to be supplied to the CPU 1 is constant and a function of controlling supply/shutdown of power to the CPU 1 in response to a power supply/power shutdown control signal S4 from the power supply control unit 2. The power supply control unit 5 is configured by a general voltage regulator. The clock generator 3 supplies or stops an operation clock in response to a clock supply/clock stop control signal S3 from the power supply unit 2.

The power supply control unit 2 outputs a shutdown request signal S1 to the CPU 1 in response to the generation of a power shutdown factor F1 provided from the external terminal. Upon receiving the shutdown request signal S1 from the power supply control unit 2, the CPU 1 activates a power shutdown microprogram μP1 and evacuates the information (program counter PC, processor status word PSW, stack pointer SP etc.) necessary in proceeding with the program to the information holding unit 4 via the internal bus 6, and outputs an evacuation completed signal S2 to the power supply control unit 2 after evacuation is completed. Upon receiving the evacuation completed signal S2 from the CPU 1, the power supply control unit 2 outputs a clock stop control signal S3 to the clock generator 3, and at the same time, outputs a power shutdown control signal S4 to the power supply unit 5. The power supply unit 5 shuts down power to be supplied to the CPU 1 upon receiving the power shutdown control signal S4 from the power supply control unit 2.

The power supply control unit 2 outputs the power supply control signal S4 to the power supply unit 5 in response to the generation of a power supply restoration factor F2 provided from the external terminal. Upon receiving the power supply control signal S4 from the power supply control unit 2, the power supply unit 5 starts to supply power to the CPU 1. The power supply control unit 2 outputs a restoration request signal S5 to the CPU 1 and also outputs the clock supply control signal S3 to the clock generator 3 when power supply voltage supplied to the CPU 1 is stabilized. Upon receiving the clock supply control signal S3 from the power supply control unit 2, the clock generator 3 restarts to supply the operation clock. Upon receiving the restoration request signal S5 from the power supply control unit 2, the CPU 1 activates a power supply restoration microprogram μP2, and restores the information necessary in proceeding with the program that had been evacuated to the information holding unit 4 in time of power shutdown to the CPU 1 via the internal bus 6, and furthermore, branches the processes to the addresses indicated by the program counter to change from the shutdown state to the program execution state, and proceeds with the program.

The power shutdown factor F1 includes overflow interrupt of the register and the timer, and such power shutdown factor F1 is provided from outside the power supply control unit 2. The power supply restoration factor F2 includes external interrupt, serial communication interrupt, overflow interrupt of the timer, and the like, and any one of such can be selected.

Figure 3:
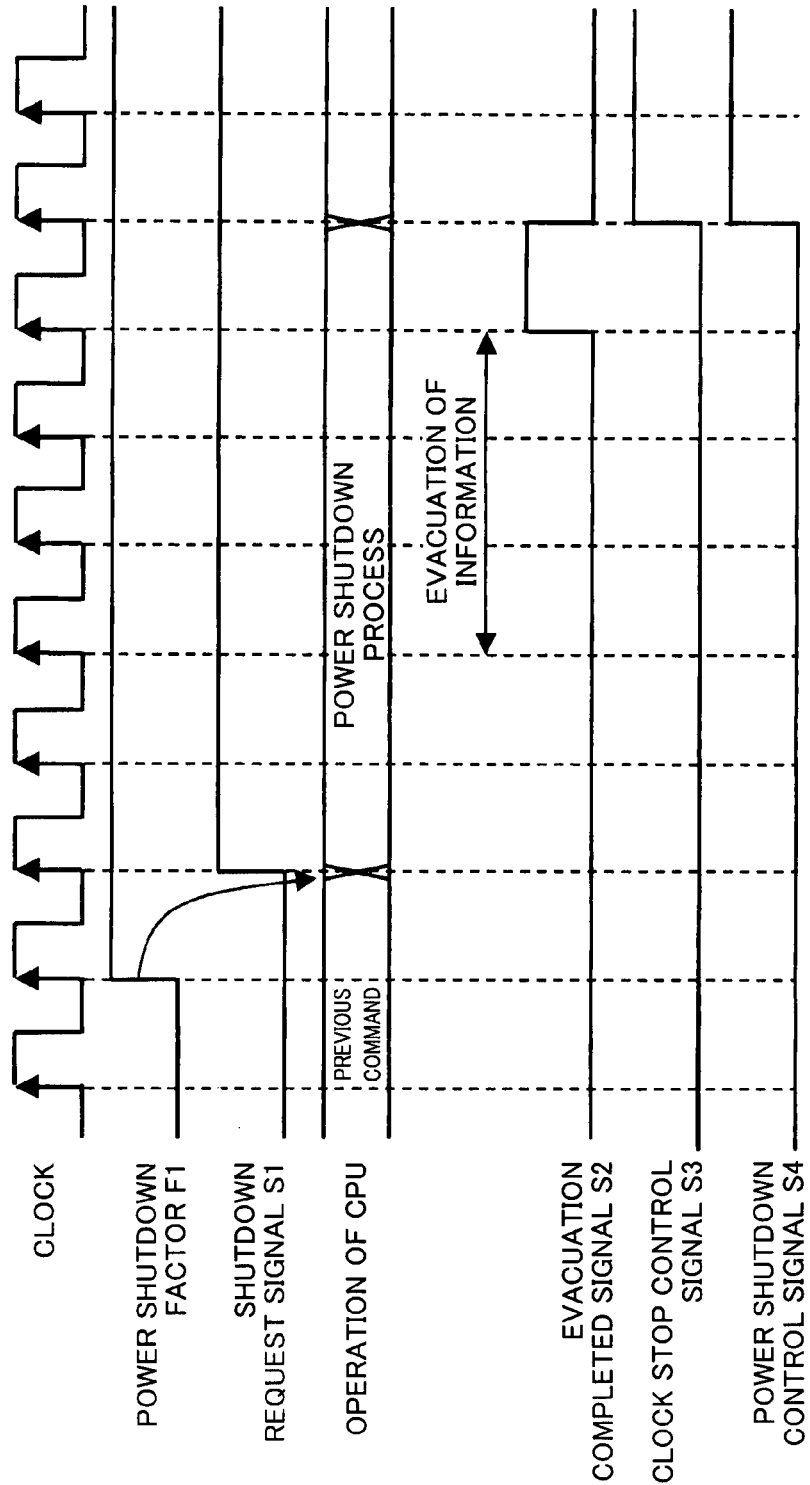
FIG. 3 is a timing chart showing the operation of a power shutdown process of the microcontroller according to the first embodiment of the present invention.

The operation of the power shutdown process of the microcontroller A of the present embodiment configured as described above will now be described according to the flowchart of FIG. 2 and the timing chart of FIG. 3.

First, in step n1, the power shutdown factor F1 is generated, which is then input from the external terminal to the power supply control unit 2, and the power supply control unit 2 outputs the shutdown request signal S1 to the CPU 1.

The CPU 1 upon receiving the shutdown request signal S1 from the power supply control unit 2, activates the power shutdown microprogram μP1 in step n2 after terminating the normal command execution. The microprogram herein refers to the control program for controlling internal sources of the CPU 1 in order to execute command, interrupt processing, and the like.

The power shutdown microprogram μP1 evacuates the information (PC, PSW, SP, etc.) necessary in proceeding with the program to the information holding unit 4 or the register via the internal bus 6 in step n3, and lastly outputs the evacuation completed signal S2 to the power supply control unit 2.

The power supply control unit 2, upon receiving the evacuation completed signal S2, outputs the clock stop control signal S3 to the clock generator 3, and also outputs the power shutdown control signal S4 to the power supply unit 5 in step n4.

The power supply unit 5, upon receiving the power shutdown control signal S4, shuts down power supply to the CPU 1 in step n5. The power shutdown of the CPU 1 is thereby completed.

The operation of restoring from power shutdown will now be described according to the flowchart of FIG. 4. First, in step n11, the power supply restoration factor F2 is generated, which is then input from the external terminal to the power supply control unit 2, and the power supply control unit 2 outputs the power supply control signal S4 to the power supply unit 5.

The power supply unit 5, upon receiving the power supply control signal S4, starts to supply power to the CPU 1 in the next step n12. When the power supply voltage stabilizes due to functions of a power supply voltage monitoring circuit and stability waiting timer, and an oscillation waveform output by an oscillation circuit stabilizes as a result thereof, the power supply control unit 2, upon detecting such stability, outputs the clock supply control signal S3 to the clock generator 3. Simultaneously, the power supply control unit 2 outputs the restoration request signal S5 to the CPU 1.

In step n13, the clock generator 3 restarts to supply the operation clock. In step n14, the CPU 1, upon receiving the restoration request signal S5, activates the power supply restoration microprogram μP2. In step n15, the activated power supply restoration microprogram μP2 restores the information (PC, PSW, SP, etc.) necessary in proceeding with the program that had been evacuated in the information holding unit 4 in time of power shutdown to the CPU 1 via the internal bus 6. Lastly, in step n16, the power supply restoration microprogram μP2 branches the processes in the CPU 1 to the addresses indicated by the program counter PC. The state thus changes from the shutdown state to the program execution state, and the program proceeds.

Figure 5:
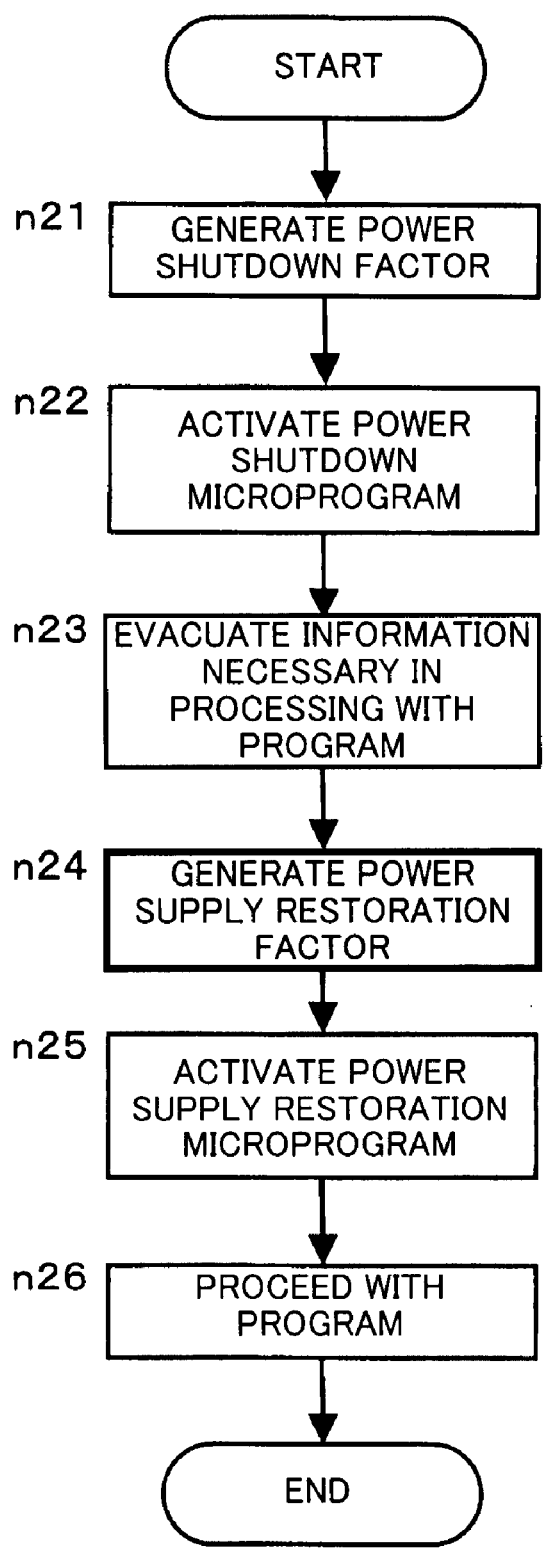
FIG. 5 is a flowchart showing the operation performed when a restoration factor is generated in the middle of the power shutdown process of the microcontroller according to the first embodiment of the present invention.

The operation performed when the power supply restoration factor F2 is generated some time before the power shutdown will now be described according to the flowchart of FIG. 5. The flow chart corresponds to a case in which the power supply restoration factor F2 is generated immediately after the information is evacuated by the power shutdown microprogram μP1.

First, in response to the input of the power shutdown factor F1 to the power supply control unit 2, the power supply control unit 2 outputs the shutdown request signal S1 to the CPU 1 in step n21. The CPU 11 upon receiving the shutdown request signal S1, activates the power shutdown microprogram μP1 in step n22. the activated microprogram μP1 evacuates the information necessary in proceeding with the program to the information holding unit 4 or the register via the internal bus 6 in step n23, and then outputs the evacuation completed signal S2 to the power supply control unit 2. When the power supply restoration factor F2 is input to the power supply control unit 2, the power supply control unit 2 outputs the restoration request signal S5 to the CPU 1 in step n24. The CPU 1, upon receiving the restoration request signal S5, activates the power supply restoration microprogram μP2' that does not restore the evacuated information in step n25. In step n26, the power supply restoration microprogram μP2' continues the program execution without restoring the evacuated information.

According to the present embodiment, the interrupt processing will not be activated between the information evacuating process and the power shutdown process by executing the process of evacuating the information necessary in proceeding with the program and the power shutdown process with a continuous microprogram. The value of the register, to which it is desired to be evacuated to, is prevented from being changed before the power shutdown. The power shutdown process can then be executed while permitting interrupt and the interrupt processing can be accepted before the power shutdown. Furthermore, since the evacuation of the information is executed by the microprogram, the information evacuating process can be performed using existing wirings of the microcontroller, whereby increase in the number of logic circuits and wirings dedicated for evacuation of information can be suppressed to a minimum.

Variants of the above embodiment are as follows. The clock generator 3 may be configured to select a mode of stopping the supply of the operation clock or a mode of not stopping the supply of the operation clock based on the setting in the register, signal, terminal, or the like as the operation upon receiving the clock stop control signal S3 from the power supply control unit 2. In such a configuration, the operation according to user preference can be set based on mode selection. In the case of the mode of not stopping the supply of the operation clock, restoration is carried out in an arbitrary time by moving the counter of the timer or in any other methods.

The power supply control unit 2 may be configured to limit a shutdown possible period. The power supply control unit 2 is provided with the power shutdown factor F1 from the external terminal, but the shutdown possible period may be set in the register to accept the power shutdown factor F1 if within the period an enable is set and to not accept the factor if outside the period the enable is set. According to such a configuration, the operation mode is diversified.

The power shutdown microprogram μP1 may be configured to evacuate the information (a program counter, processor status word, stack pointer, etc.) necessary in proceeding with the program in a stack region in the information holding unit 4, and then evacuate only the value of the stack pointer for pointing to the evacuation place to a specific region. In such a configuration, a dedicated logic becomes a minimum since only the value of the stack pointer for pointing to the evacuation place is evacuated to the specific region.

Furthermore, if configured so as to use an interruption system of the microcontroller A as the power supply restoration factor F2, a circuit does not need to be additionally formed.

Second Embodiment

Figure 6:
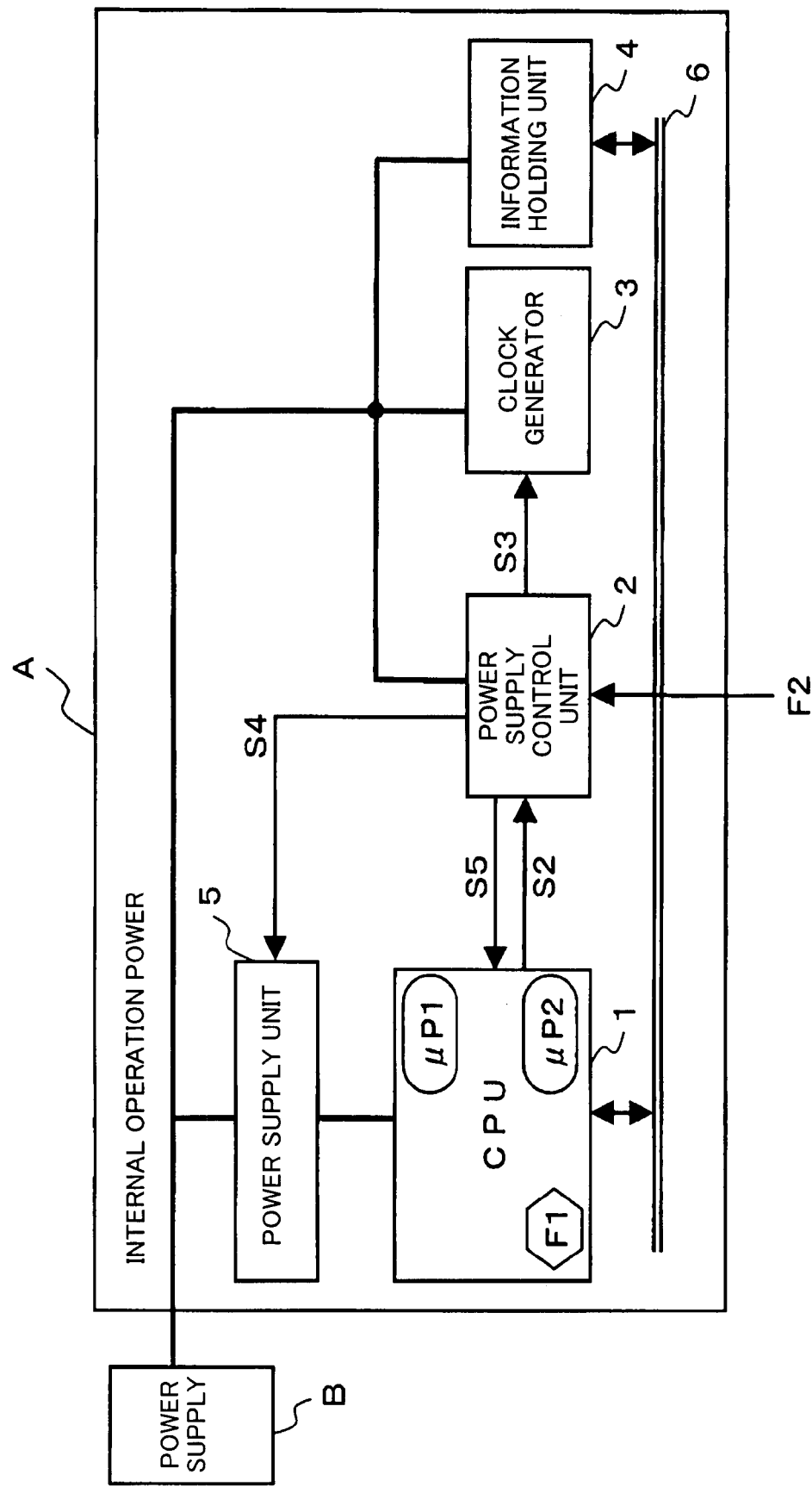
FIG. 6 is a block diagram showing a configuration of a microcontroller according to a second embodiment of the present invention.
Figure 7:
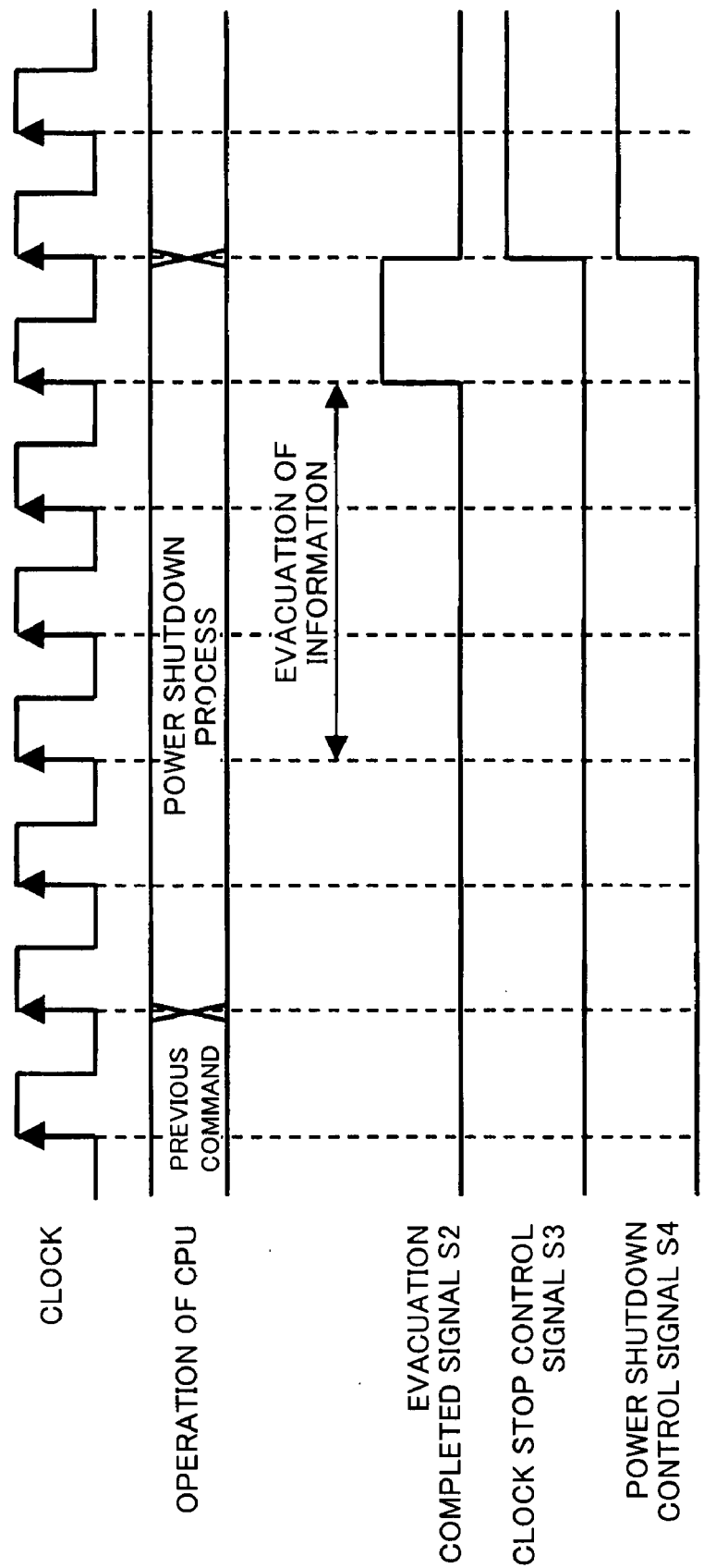
FIG. 7 is a timing chart showing the operation in a power shutdown process of the microcontroller according to the second embodiment of the present invention.

The power shutdown factor is provided from the external terminal in the first embodiment described above, whereas in the second embodiment, the present invention is applied to a configuration in which the power shutdown factor is provided by a command. FIG. 6 is a block diagram showing a configuration of a microcontroller according to the second embodiment of the present invention. In this configuration, the power shutdown factor F1 is generated inside the CPU 1 instead of the power supply control unit 2. The power supply control unit 2 does not generate the shutdown request signal S1 and does not provide the signal to the CPU 1. Other configurations are the same as FIG. 1 for the first embodiment, and thus the description thereof will be omitted. FIG. 7 is a timing chart showing the operation in the power shutdown process of the microcontroller of the second embodiment. In the timing chart, the power shutdown factor F1 and the shutdown request signal S1 shown in FIG. 3 are not illustrated.

The operation of the microcontroller according to the present embodiment configured as described above will now be described. First, the operation of power shutdown will be described. The flowchart of the power shutdown process is the same as FIG. 2 for the first embodiment. When a power shutdown command corresponding to the power shutdown factor F1 defined in advance in the CPU is decoded in the CPU 1, the CPU 1 activates the power shutdown microprogram μP1, and evacuates the information necessary in proceeding with the program to the information holding unit 4 or the register. After performing the above processes, the CPU 1 ultimately outputs the evacuation completed signal S2 to the power supply control unit 2. The power supply control unit 2, upon receiving the evacuation completed signal S2, outputs the clock stop control signal S3 to the clock generator 3, and at the same time, outputs the power shutdown control signal S4 to the power supply unit 5. The power supply unit 5, upon receiving the power shutdown control signal S4, shuts down power supply to the CPU 1. The power shutdown of the CPU 1 is thereby completed. The operation of restoring from the power shutdown is the same as the first embodiment, and thus the description thereof will be omitted.

Figure 8:
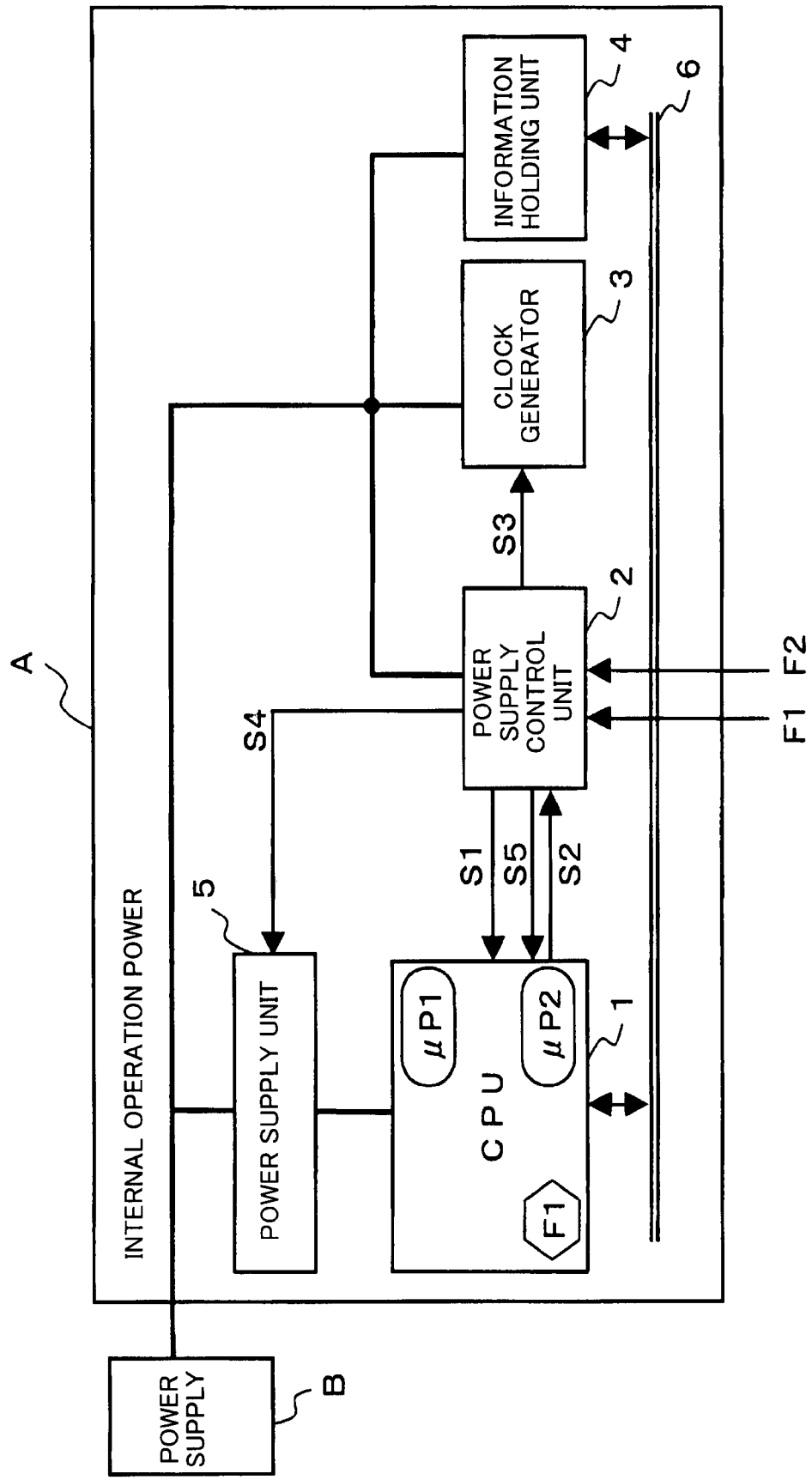
FIG. 8 is a block diagram showing a configuration of a microcontroller according to a variant of the second embodiment of the present invention.

According to the present embodiment, power shutdown is readily performed by software by having the power shutdown command as the power shutdown factor F1. As shown in FIG. 8, a state in which the power shutdown factor F1 is provided from the external terminal and a state in which the power shutdown factor F1 is provided by a command may both be prepared, so that either one or both methods can be selected in the register, the terminal, or the like. The microcontroller can be more universally applied in such a configuration.

In restoring the power supply, a plurality of types of power supply restoration microprogram uP2 to be executed such as, (a) microprogram for restoring the evacuated information necessary in proceeding with the program, and proceeding with the program, (b) microprogram for jumping to a specific address and running a dedicated initialization and a restoration application program to restore the set value without using the evacuated information, and (c) microprogram for resetting, may be prepared to be selected by the register, signal, terminal, or the like.

Furthermore, the power shutdown microprogram μP1 and the power supply restoration microprogram μP2 may be selectively activated, according to the generated power shutdown factor F1 or a type of the selected power shutdown factor F1. In this configuration, since the number of information necessary in proceeding with the program changes, an efficient application system can be built by executing the microprogram corresponding thereto.

Third Embodiment

Figure 9:
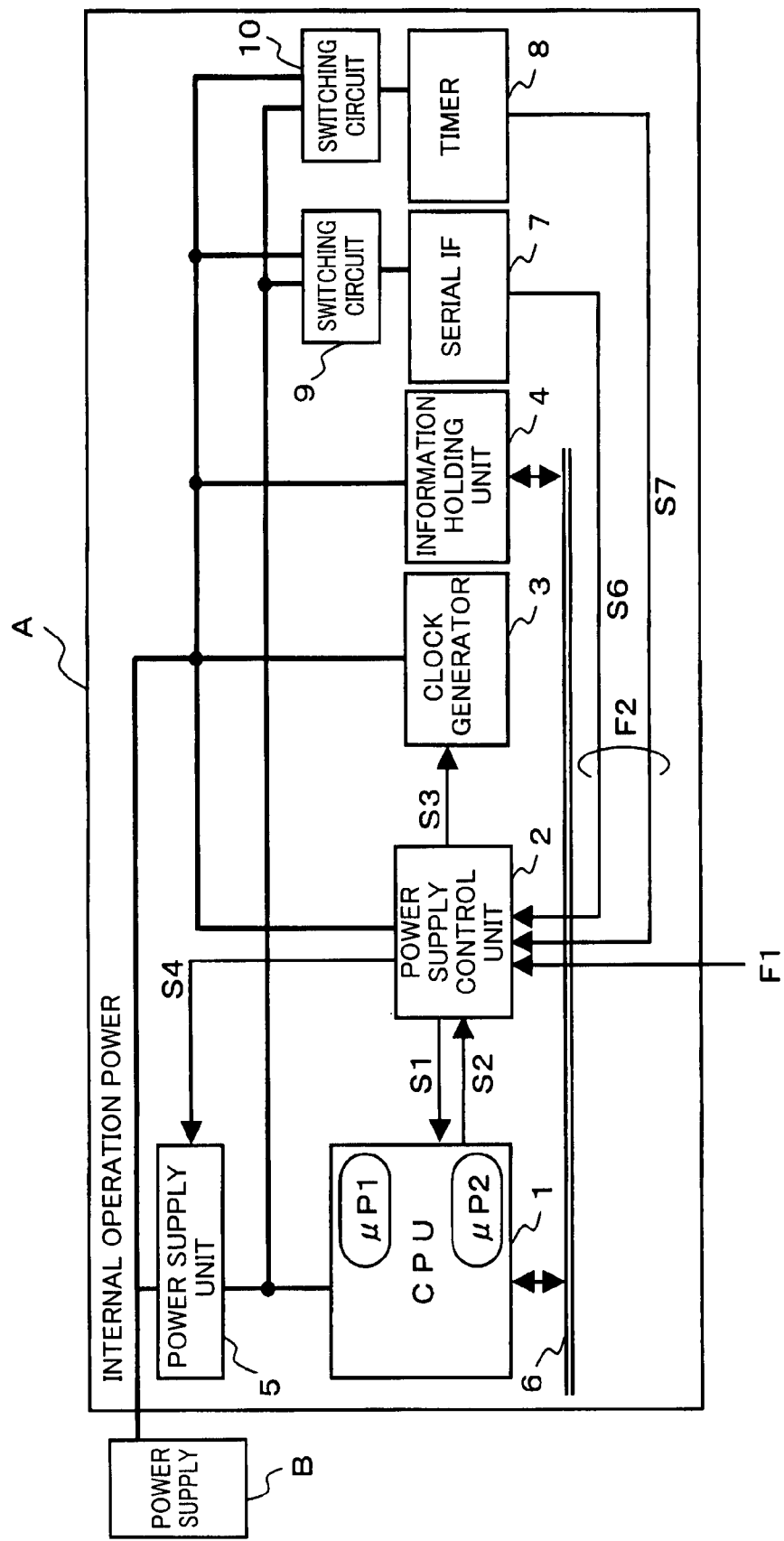
FIG. 9 is a block diagram showing a configuration of a microcontroller according to a third embodiment of the present invention.

FIG. 9 is a block diagram showing a configuration of a microcontroller according to a third embodiment of the present invention. In FIG. 9, the same reference characters as in FIG. 1 for the first embodiment are denoted for the same components. In FIG. 9, reference number 7 is a serial interface, 8 is a timer, 9 is a first switching circuit for ON/OFF controlling the power supply to the serial interface 7, and 10 is a second switching circuit for ON/OFF controlling the power supply to the timer 8. The first switching circuit 9 performs a switch of whether to supply or shutdown, on a steady basis, the internal operation power received from the power supply B to the serial interface 7. The second switching circuit 10 performs a switch of whether to supply or shutdown, on a steady basis, the internal operation power received from the power supply B to the timer 8. The first switching circuit 9 and the second switching circuit 10 are configured by a general analog switch or a voltage regulator. The serial interface 7 outputs a signal S6 that is to become the power supply restoration factor F2 to the power supply control unit 2. The timer 8 outputs a signal S7 that is to become the power supply restoration factor F2 to the power supply control unit 2. No restoration request signal S5 is made from the power supply control unit 2 to the CPU 1. Other configurations are the same as the first embodiment, and thus the description thereof will be omitted.

The operation of the microcontroller A according to the present embodiment configured as described above will now be described. When a mode in which the first switching circuit 9 is switched to the ON state to supply the internal operation power is set in the microcontroller A, the internal operation power is constantly supplied to the serial interface 7 even in time of power shutdown. The serial communication thus becomes possible. Here, the power supply restoration factor F2 in step nil of FIG. 4 becomes, interrupt when the serial interface 7 receives information of one frame, rise in slave clock of the serial interface 7, etc.

Therefore, when restoring with the slave clock of the serial interface 7, the power is selectively supplied to a shift buffer unit and a wake-up circuit of the serial interface 7, and power supply to other sections is shutdown.

When setting to a mode in which the second switching circuit 10 is switched to the ON state to supply the internal operation power, the internal operation power is constantly supplied to the timer 8 even in time of power shutdown. Thus, the power shutdown process is performed only for a specific time by generating interrupt every set constant time.

In a recording device, for example, a mechanism in which the microcontroller for system control generates the interrupt a few dozen seconds before the recording time to restore the power supply is used, where such interrupt can be used as the power supply restoration factor F2 in the present embodiment. When restoring with the timer 8, power is selectively supplied to the clock timer, the clock oscillating circuit, and the wake-up circuit, and power supply to other sections is shutdown. The standby power thus is greatly reduced.

Fourth Embodiment

Figure 10:
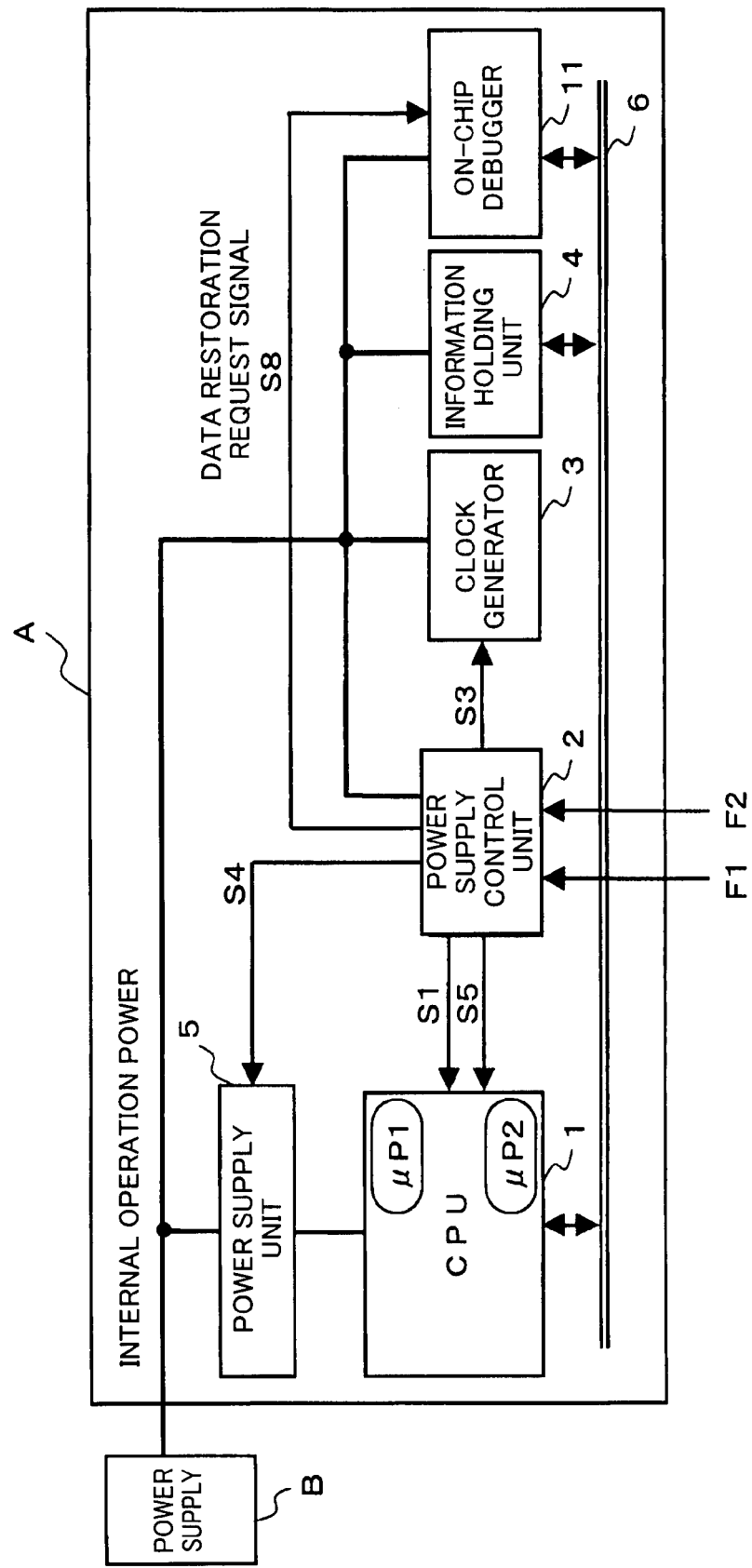
FIG. 10 is a block diagram showing a configuration of a microcontroller according to a fourth embodiment of the present invention.

FIG. 10 is a block diagram showing a configuration of a microcontroller according to a fourth embodiment of the present invention. An on-chip debugger (OCD) 11 for performing control to debug the software is normally mounted on the microcontroller. The on-chip debugger 11 constantly monitors the register in the CPU 1, and includes a data holding circuit for holding the information on the internal operation of the CPU 1. The on-chip debugger 11 outputs the held information to the outside through a dedicated terminal to debug the microcontroller at outside of the chip. The on-chip debugger 11 does not necessary require the evacuation completed signal S2 provided from the CPU 1 to the power supply control unit 2 unlike the configuration (FIG. 1) of the first embodiment. When the power supply voltage supplied to the CPU 1 stabilizes, the power supply control unit 2 outputs a data restoration request signal S8 to the on-chip debugger 11. Upon receiving a data restoration request signal S8, the on-chip debugger 11 reads the data in time of power shutdown that had been evacuated to the data holding circuit incorporated in the on-chip debugger 11 itself, and restores the read data in time of power shutdown to the CPU 1 via the internal bus 6.

Figure 11:
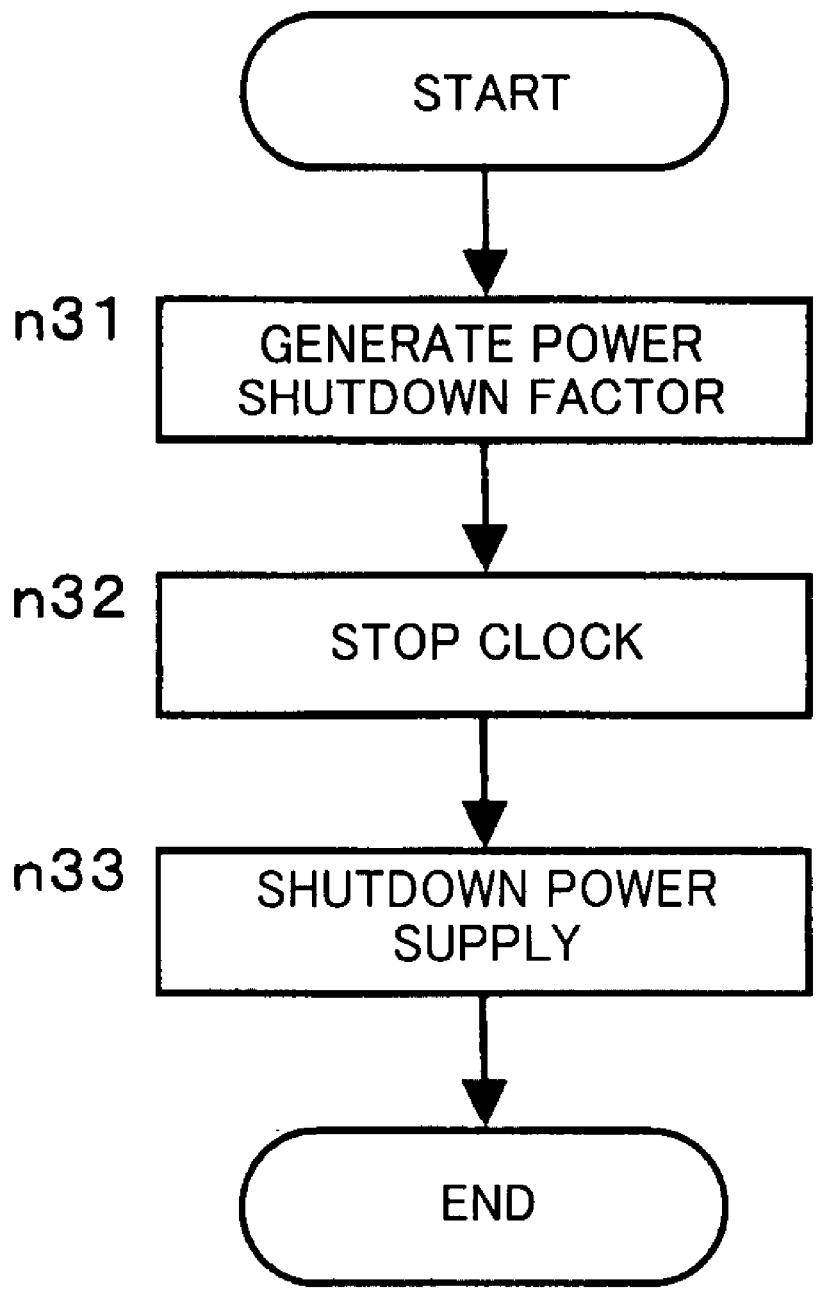
FIG. 11 is a flowchart showing the operation of a power shutdown process of the microcontroller according to the fourth embodiment of the present invention.

The operation of the power shutdown process of the microcontroller A of the present embodiment configured as described above will now be described according to the flowchart of FIG. 11. First, in step n31, the power shutdown factor F1 is generated, which power shutdown factor F1 is input to the power supply control unit 2, and the power supply control unit 2 outputs the clock stop control signal S3 to the clock generator 3 and at the same time outputs the power shutdown control signal S4 to the power supply unit 5. The clock generator 3, upon receiving the clock stop control signal S3, stops the supply of the operation clock in step n32. The power supply unit 5, upon receiving the power shutdown control signal S4 shuts down power to the CPU 1 in step n33. The power shutdown of the CPU 1 is thereby completed. Since the register in the CPU 1 is constantly monitored by the on-chip debugger 11, the information evacuated from the CPU 1 to the information holding unit 4 in time of power shutdown becomes the data other than the monitored data, and thus the amount of data decreases.

Figure 12:
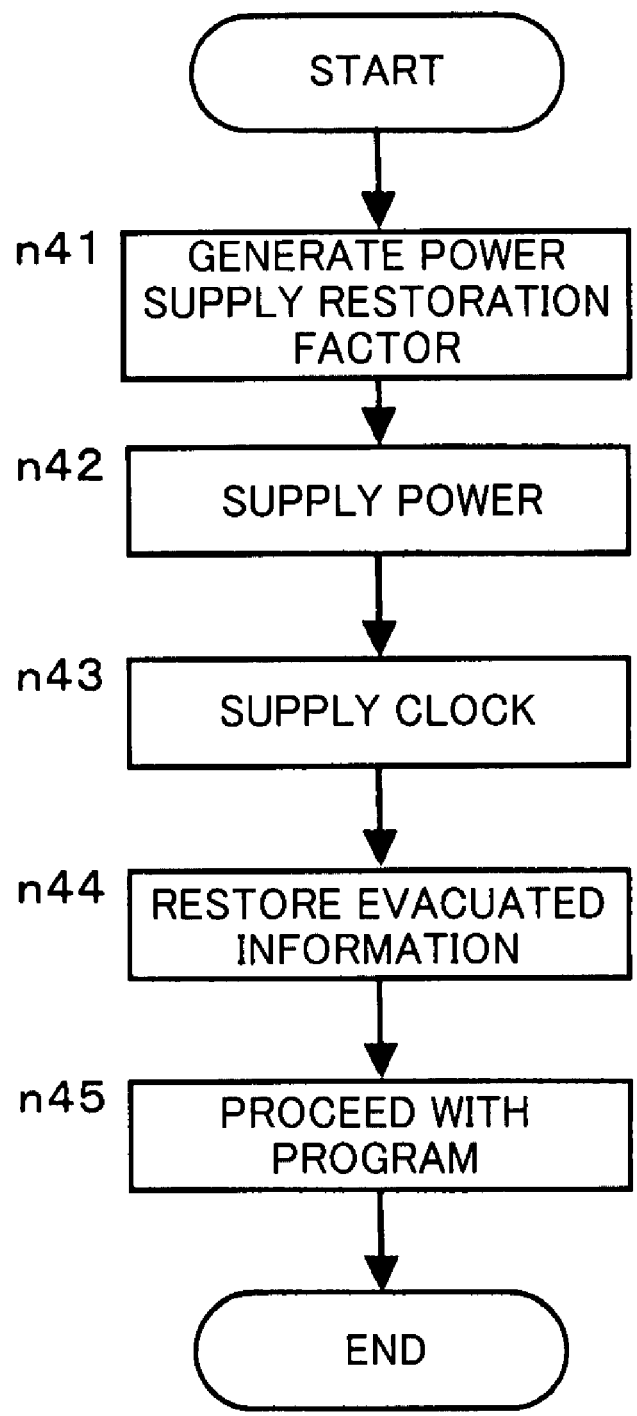
FIG. 12 is a flowchart showing the operation of a power supply restoration process of the microcontroller according to the fourth embodiment of the present invention.

The operation of the power supply restoration process of the microcontroller according to the present embodiment configured as described above will now be described according to the flowchart of FIG. 12. In step n41, the power supply restoration factor F2 is generated, and when the power supply restoration factor F2 is input to the power supply control unit 2, the power supply control unit 2 outputs the power supply control signal S4 to the power supply unit 5. In step n42, the power supply unit 5, upon receiving the power supply control signal S4, starts to supply power to the CPU 1. When the supplied power supply voltage stabilizes and the oscillation waveform output by the oscillation circuit stabilizes due to the power supply voltage monitoring circuit, stability waiting timer, and the like, the power supply control unit 2, upon detecting such stabilization, outputs the clock supply control signal S3 to the clock generator 3. At the same time, the power supply control unit 2 outputs the data restoration request signal S8 to the on-chip debugger 11. In step n43, the clock generator 3 restarts to supply the operation clock. In step n44, the on-chip debugger 11, upon receiving the data restoration request signal S8, reads the data in time of power shutdown that had been evacuated to the data holding circuit incorporated in the on-chip debugger 11 itself and restores the read data in time of power shutdown to the CPU 1 via the internal bus 6. Lastly, the CPU 1 branches the executing process to the addresses shown by the program counter PC to change from the shutdown state to the program execution state and proceeds with the program.

According to the present embodiment, since the on-chip debugger 11 is constantly monitoring the register in the CPU 1, the information to be evacuated from the CPU 1 to the information holding unit 4 in time of power shutdown reduces and the speed of executing the power shutdown increases.

Fifth Embodiment

Figure 13:
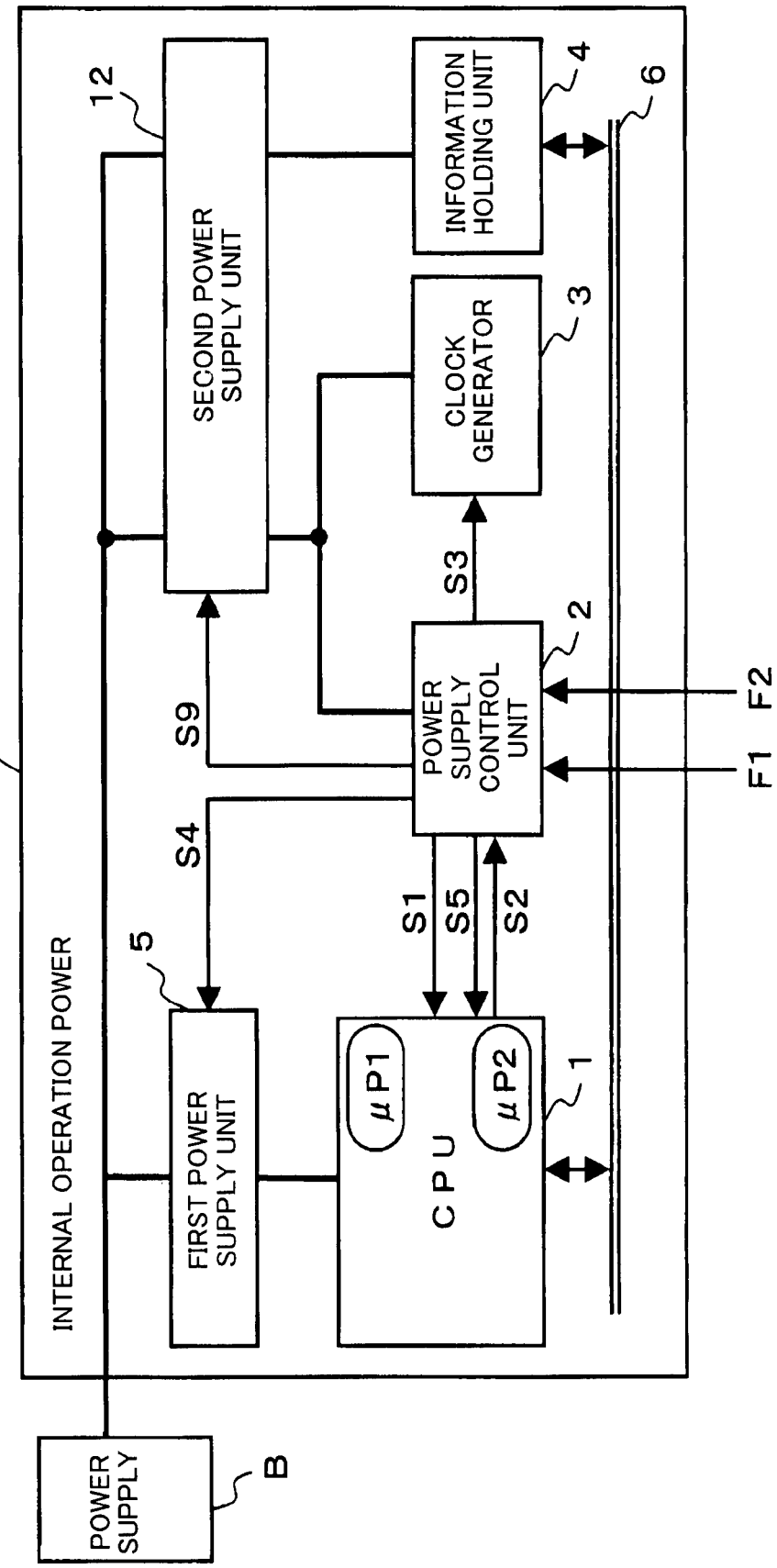
FIG. 13 is a block diagram showing a configuration of a microcontroller according to a fifth embodiment of the present invention.

FIG. 13 is a block diagram showing a configuration of a microcontroller according to a fifth embodiment of the present invention. The present embodiment includes a second power supply unit 12 separate from the first power supply unit 5. The second power supply unit 12 is arranged between the power supply B and the power supply control unit 2, between the power supply B and the clock generator 3, and between the power supply B and the information holding unit 4.

The second power supply unit 12 has a function of, making the voltage to be supplied to the power supply control unit 2, the clock generator 3, and the information holding unit 4 constant; and controlling the power to be supplied to the power supply control unit 2, the clock generator 3, and the information holding unit 4 upon receiving a power shutdown control signal S9 from the power supply control unit 2.

The second power supply unit 12 having such functions is configured by a general voltage regulator. Other configurations are the same as FIG. 1 for the first embodiment, and thus the description thereof will be omitted.

The operation of the microcontroller according to the present embodiment configured as described above will now be described. When the power shutdown factor F1 is generated, and the power supply control unit 2 outputs a power shutdown control signal S9 to the second power supply unit 12. The second power supply unit 12, upon receiving the power shutdown control signal S9, lowers the internal operation power, and supplies the lowered internal operation voltage to the power supply control unit 2, the clock generator 3, and the information holding unit 4. In the lowering control, the internal operation power is lowered to the lower limit voltage at which information can be held.

According to the present embodiment, the leakage current in the information holding unit 4 and other logic circuits can be reduced and the power can be saved.

Sixth Embodiment

FIG. 14 is a block diagram showing a configuration of a microcontroller according to a sixth embodiment of the present invention. Reference number 13 is a gate circuit. After a test mode signal S10 and the power shutdown control signal S4 are input, the gate circuit 13 selects either of them in an alternative way and outputs the selected signal to the power supply unit 5. Other configurations are the same as the first embodiment, and thus the description thereof will be omitted.

Figure 16:
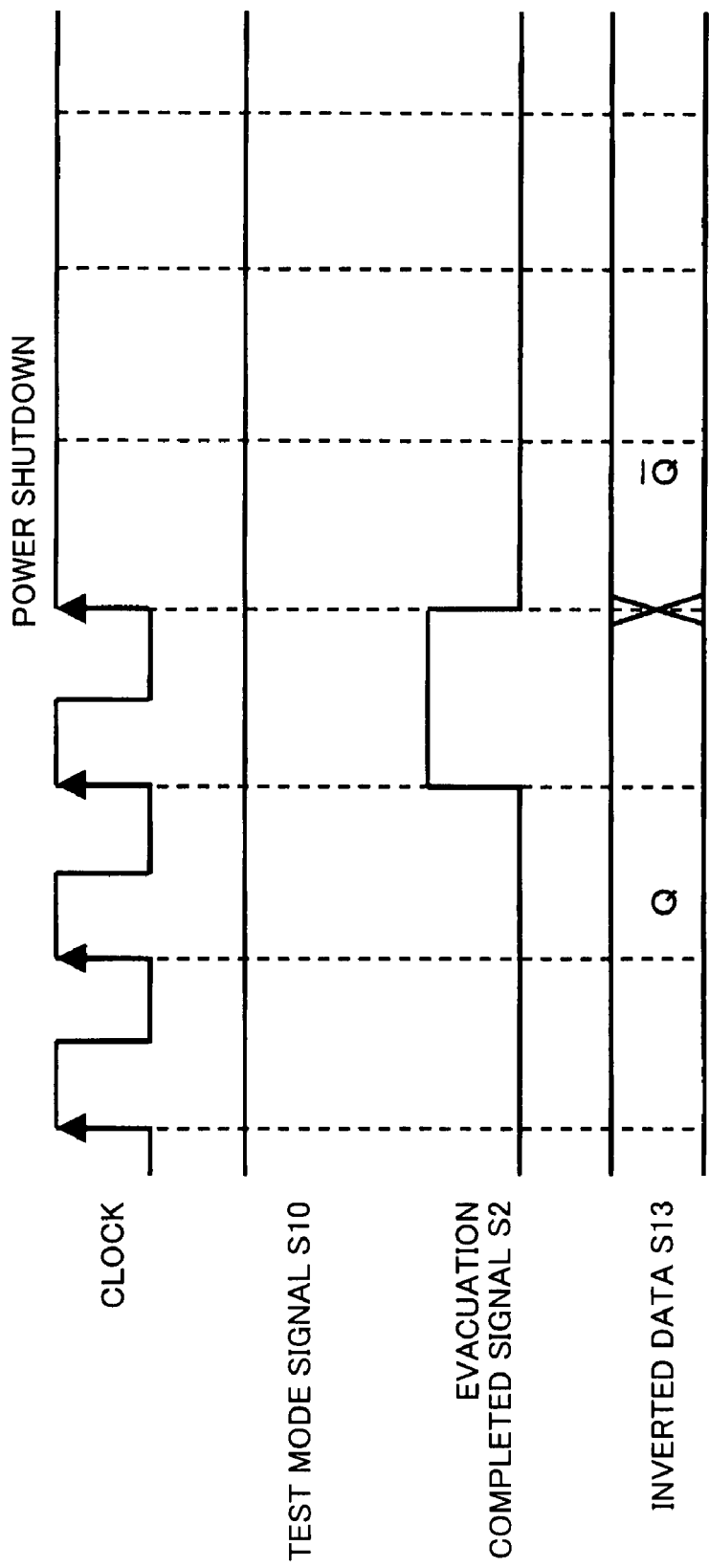
FIG. 16 is a timing chart showing the operation in test of the microcontroller according to the sixth embodiment of the present invention.

FIG. 15 shows an internal configuration of the CPU 1. In CPU 1, when the test mode signal S10 and a shutdown sequence signal S11 are respectively in an assert state, the output of the gate circuit 13 is asserted, and a selector 16 selects an output of an exclusive OR gate 15 in place of normal data S12. The exclusive OR gate 15 takes the exclusive OR of the evacuation completed signal S2 and the output signal S13 of an evacuation necessary register 17. That is, when the evacuation completed signal S2 is asserted in one shot pulse, the exclusive OR gate 15 inverts the output signal S13 from the evacuation necessary register 17, and outputs the same as inverted data S13 via the selector 16 and the evacuation necessary register 17. FIG. 16 shows a timing chart of the relevant process.

Figure 17:
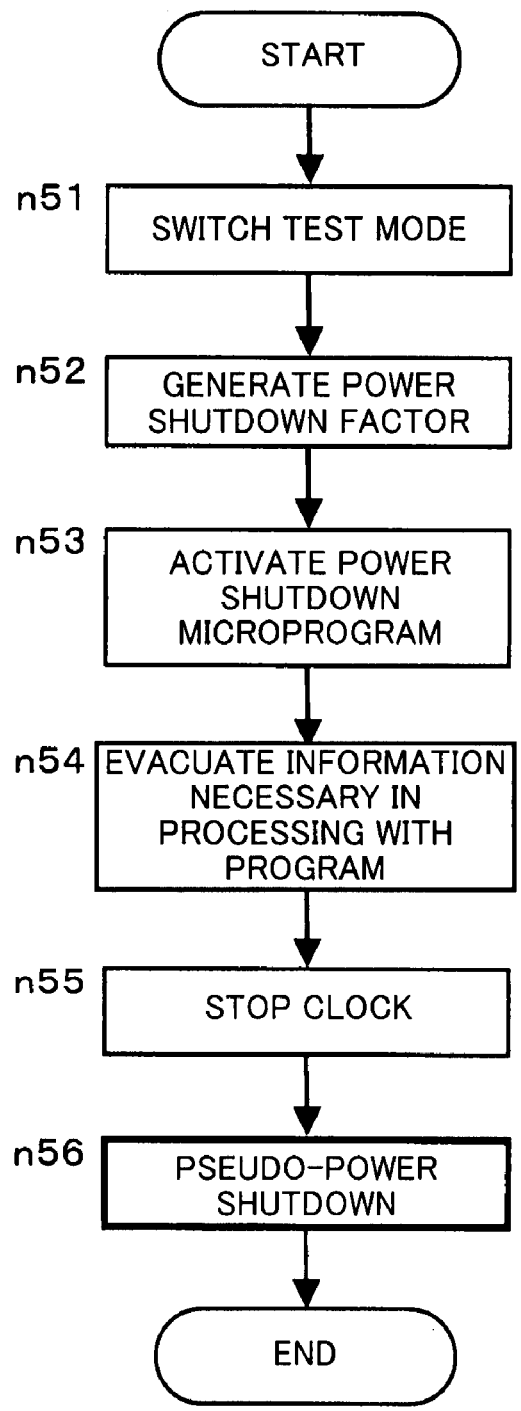
FIG. 17 is a flowchart showing the operation in test of the microcontroller according to the sixth embodiment of the present invention.

The operation of a test process of the microcontroller according to the present embodiment configured as described above will now be described according to the timing chart of FIG. 16 and the flowchart of FIG. 17.

First, in step n51, the CPU 1 issues the test mode signal S10 through combination etc. of external inputs. When the test mode signal S10 is asserted, the gate circuit 13 invalidates the control signal S4 from the power supply control unit 2 to the power supply unit 5. The power supply unit 5 is invalidated even if the control signal S4 is asserted, and does not change to the power shutdown mode. When the power shutdown factor F1 is generated, the power supply control unit 2 outputs the shutdown request signal S1 to the CPU 1 in step n52. After terminating the normal command execution, the CPU 1, upon receiving the shutdown request signal S1, activates the power shutdown microprogram μP1 in step n53. In step n54, the activated power shutdown microprogram μP1 evacuates the information necessary in proceeding with the program to the information holding unit 4 or the register, and outputs the evacuation completed signal S2 to the power supply control unit 2. In step n55, the power supply control unit 2, upon receiving the evacuation competed signal S2, outputs the clock stop control signal S3 to the clock generator 3. The clock generator 3, upon receiving the clock stop control signal S3, stops the supply of the operation clock. In step n56, the CPU 1 overwrites the inverted data S13 to pseudo-realize the relevant state to obtain the power shutdown state.

According to the present embodiment, the CPU 1 pseudo-realizes power shutdown by providing the inverted data S13, so that the same conditions as in shutdown are achieved with the power turned ON. Thus, the execution speed of various tests increases, and the test cost is suppressed. When performing the test of power shutdown, the setting of power shutdown/restoration requires a great amount of test hours on a tester, but the test hours can be reduced since the same conditions as in shutdown are achieved with the power turned ON.

Seventh Embodiment

Figure 20:
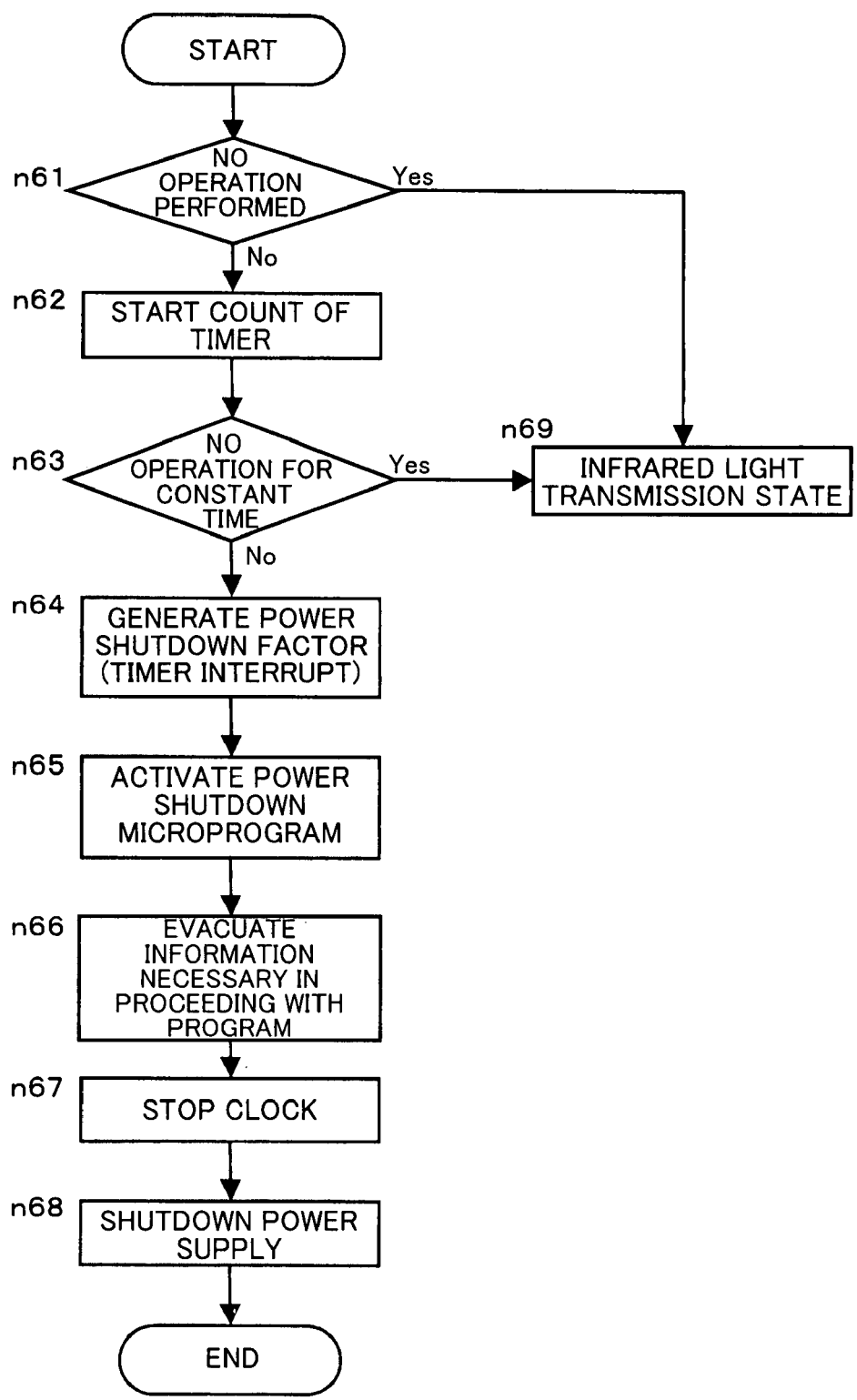
FIG. 20 is a flowchart showing the operation of the power shutdown process of the microcontroller according to the seventh embodiment of the present invention.

FIG. 18 is a schematic view of a communication device according to a seventh embodiment of the present invention, and FIG. 19 is a block diagram showing a configuration of a microcontroller according to the seventh embodiment. In the communication device, the key input signal by the key input of an input unit 21 is output to the microcontroller A, and in turn, the microcontroller A outputs data to a signal transmitting unit 22 including an infrared light emitting diode. The signal transmitting unit 22 transfers the data to DVD and photodiodes of a television body by infrared light. The operation of the power shutdown process of the microcontroller A of the present embodiment configured as described above will now be described according to the flowchart of FIG. 20.

First, in step n61, the microcontroller A determines whether or not the key input is performed on the input unit 21 of the communication device. If key input is not detected in step n61, the microcontroller A starts count of the timer 8 in step n62. In step n63, the microcontroller A then continues, for a constant time, the determination on whether or not the key input is performed on the input unit 21 of the communication device. If the key input is not detected even after the constant time has elapsed in step n62, the timer 8 outputs a power shutdown factor F3 to the power supply control 2 etc. in step n64. In response to the input of the power shutdown factor F3 to the power supply control unit 2, the power supply control unit 2 outputs the shutdown request signal S1 to the CPU 1. After terminating the normal command execution, the CPU 1, upon receiving the shutdown request signal S1, activates the power shutdown microprogram μP1 in step n65. In step n66, the CPU 1 evacuates the information necessary in proceeding with the program to the information holding unit 4 or the register via the internal bus 6, and ultimately outputs the evacuation completed signal S2 to the power supply control unit 2. The power supply control unit 2, upon receiving the evacuation completed signal S2, outputs the clock stop control signal S3 to the clock generator and outputs the power shutdown control signal S4 to the power supply unit 5 in step n67. The power supply unit 5, upon receiving the power shutdown control signal S4, shuts down power supply to the CPU 1 and the timer 8 in step n68. The power shutdown of the CPU 1 is thereby completed. If recognized that the key input is performed on the input unit 21 of the control device in any one of step n61 to step n63, the CPU 1 changes to an infrared light transmission state in step n69.

Figure 21:
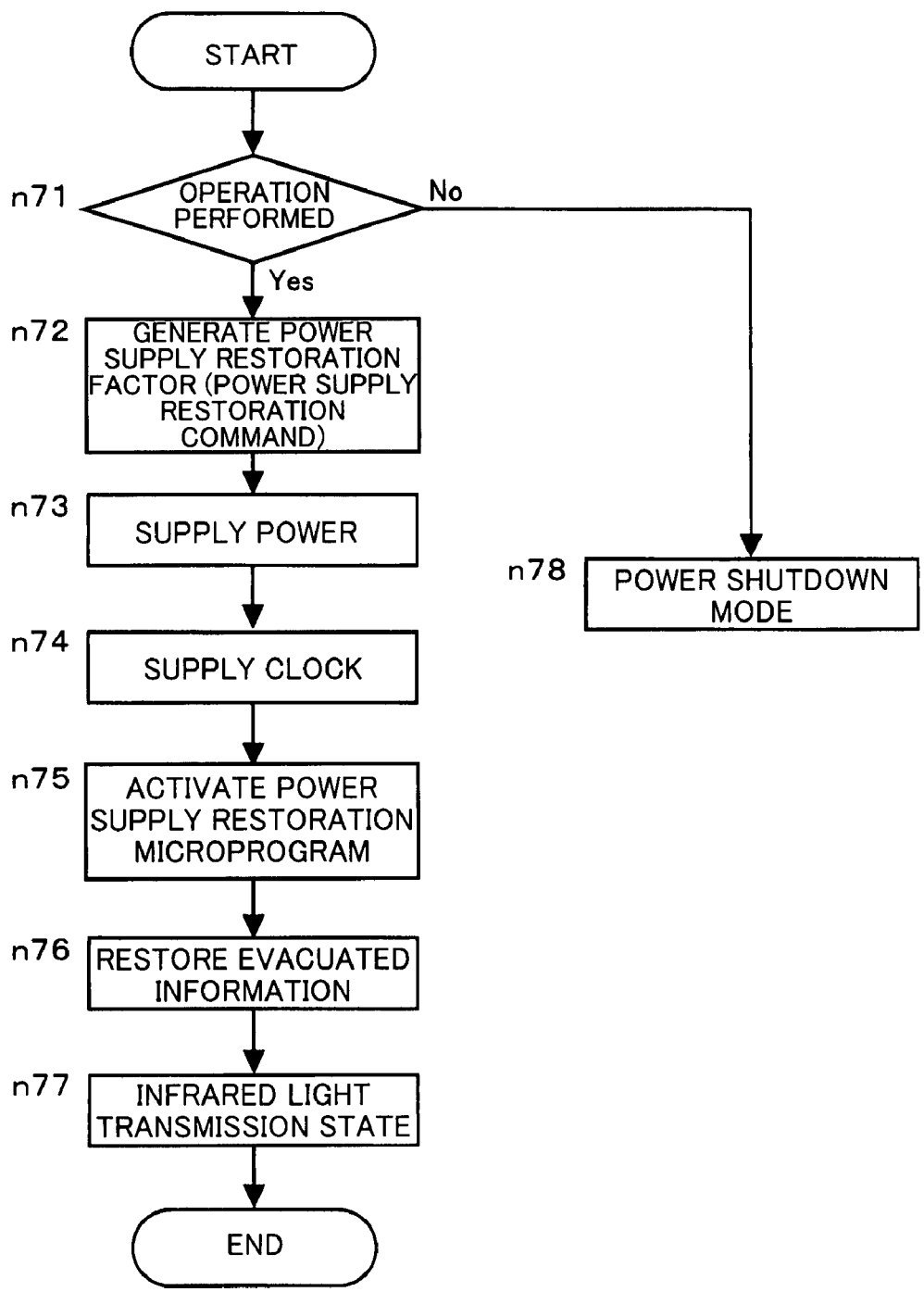
FIG. 21 is a flowchart showing the operation of the power supply restoration process of the microcontroller according to the seventh embodiment of the present invention.

The operation of power supply restoration of the microcontroller A of the present embodiment configured as described above will now be described according to the flowchart of FIG. 21. First, in step n71, the microcontroller A determines whether or not the key input is performed on the input unit 21 of the communication device. If recognized that the key input is performed on the input unit 21 in step n71, the microcontroller A assumes the key input from the input unit 21 of the communication device as generation of the power supply restoration factor in step n72 and outputs the power supply restoration factor F2 to the power supply control unit 2. The power supply control unit 2, upon receiving the power supply restoration factor F2, outputs the power supply control signal S4 to the power supply unit 5. In step n73, the power supply unit 5, upon receiving the power supply control signal S4, starts to supply power to the CPU 1. The power supply control unit 2 determines whether or not the power supply voltage is stabilized and the oscillation waveform output by the oscillation circuit is stabilized by the operation of the power supply voltage monitoring circuit, stability waiting timer, or the like. When recognizing that the oscillation waveform is stabilized, the power supply control unit 2 outputs the clock supply control signal S3 to the clock generator 3. At the same time, the power supply control unit 2 outputs the restoration request signal S5 to the CPU 1. In step n74, the clock generator 3 restarts to supply the operation clock. The CPU 1, upon receiving the restoration request signal, activates the power supply restoration microprogram μP2 in step n75. The activated power supply restoration microprogram μP2 restores the information necessary in proceeding with the program evacuated to the information holding unit 4 or the register in time of power shutdown to the CPU 1, and changes to the infrared light transmission state in step n76. Lastly, the power supply restoration microprogram μP2 branches the processes in the CPU 1 to the addresses indicated by the program counter PC. The state thus changes from the shutdown state to the program execution state, and the program proceeds. If not recognized that the key input is performed on the input unit 21 of the communication device in step n71, the power supply control unit 2 maintains the power shutdown mode in the next step n78.

Therefore, when using the present invention to the application of the communication device such as a remote controller, the process by the present invention serves as a substitute of the stop mode process. Thus, the mode changes to the power shutdown mode if the button is not pushed for a constant time. In the power supply restoration process, the input in the communication device is assumed as the restoration factor to change to the power supply restoration mode.

According to the present embodiment, when used in the communication device main body, the mode changes to the power shutdown mode if operation is not made for a constant time, and if input is again made, such input is assumed as the restoration factor to change to the power supply restoration mode. Significant power reduction is thereby achieved.

Eighth Embodiment

Figure 23:
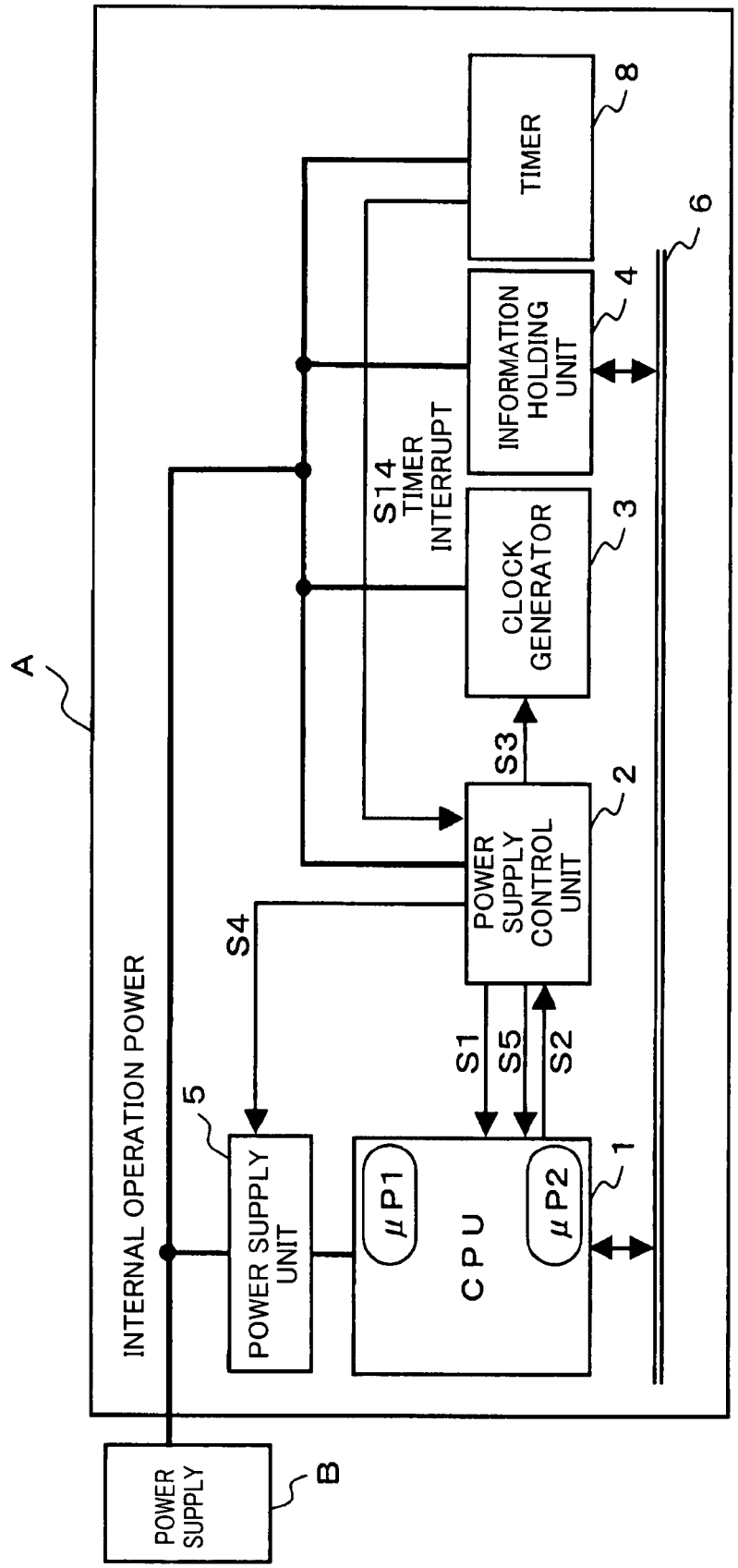
FIG. 23 is a block diagram showing a configuration of a microcontroller according to an eighth embodiment of the present invention.

FIG. 22 is a system configuration view of a recording device according to an eighth embodiment of the present invention, and FIG. 23 is a block diagram showing a configuration of a microcontroller according to the eighth embodiment. As shown in FIG. 22, an analog image signal is signal processed by a three dimensional YC separation circuit and a video decoder circuit in a three dimensional YC separation built-in video decoder 23, and thereafter input to a DVD recorder LSI 25. Furthermore, the analog image signal is signal processed by an image processing DSP 27 of the DVD recorder LSI 25, and then output from the DVD recorder LSI 125. A digital image signal read by the DVD driver is signal processed by a DSP servo of an optical disc controller LSI 24, and then input to the DVD recorder LSI 25. The digital image signal is also signal processed by the image processing DSP 27 of the DVD recorder LSI 25 and the microcontroller A and then output from the DVD recorder LSI 25.

In the microcontroller of FIG. 23, the timer 8 generates a timer interrupt S14 to the power supply control unit 2 at every constant time. When used in a recording device such as a recorder, the microcontroller for system control generates an interrupt a few dozen seconds before the recording time to restore the power in the recording device, but in the present embodiment, such interrupt processing is used as the timer interrupt S14.

Figure 24:
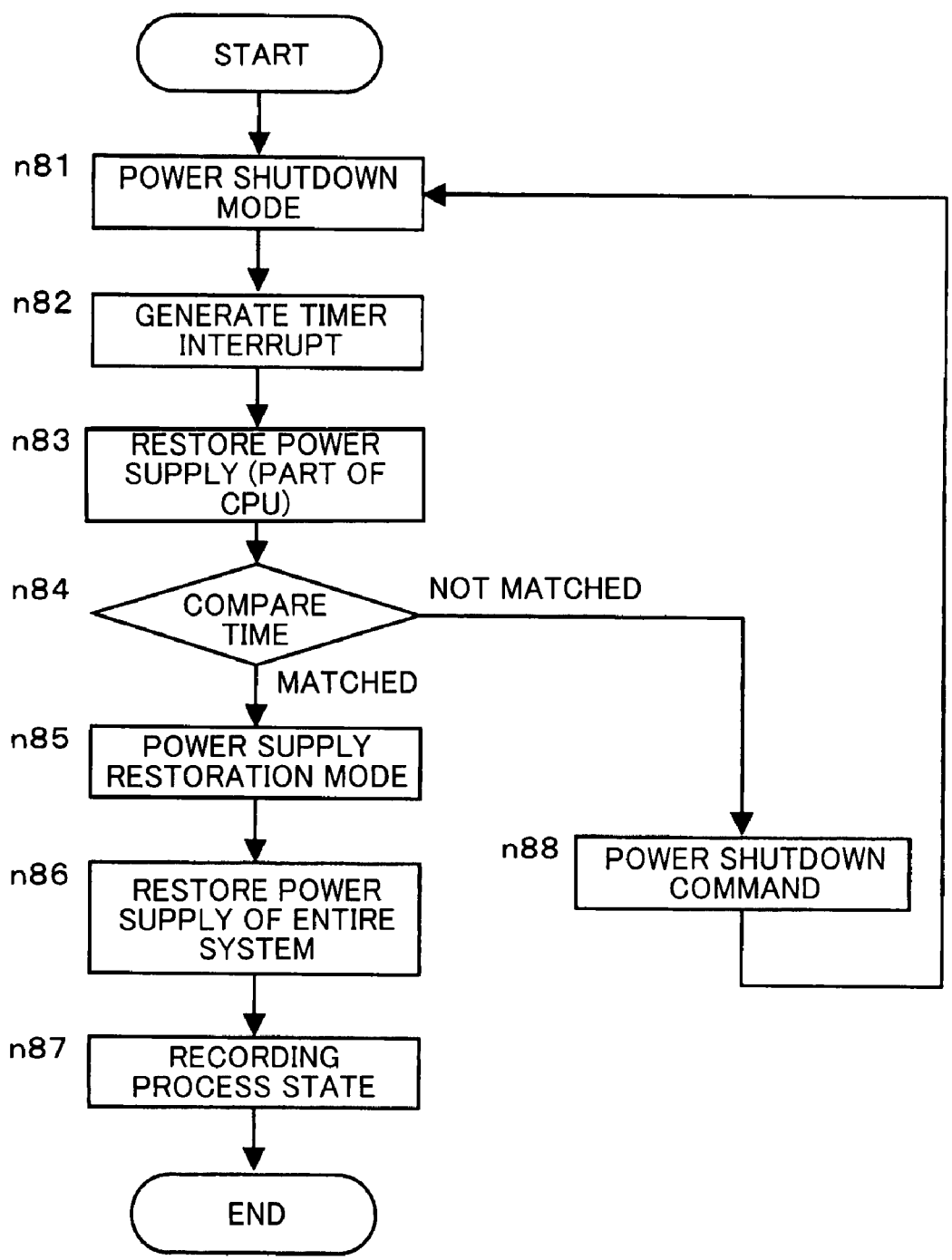
FIG. 24 is a flowchart showing the operation of the power supply restoration process of the microcontroller according to the eighth embodiment of the present invention.

The power supply restoration operation of the microcontroller A according to the present embodiment configured as described above will now be described according to the flowchart of FIG. 24. First, in step n81, the processing mode of the microcontroller A changes to the power shutdown mode. In the next step n82, the timer 8 outputs the timer interrupt S14 to the power supply control unit 2. The power supply control unit 2, upon receiving the timer interrupt S14, outputs the power supply control signal S4 to the power supply unit 5 in step n83. The power supply unit 5, upon receiving the power supply control unit S4, restarts to supply power to the CPU 1. In step n84, the CPU 1 compares the time a constant time before the recording programmed time stored in the information holding unit 4 and the current time. If the comparison result shows that the two match, the CPU 1 changes to the power supply restoration mode in step n85. In step n86, the CPU 1 supplies power to the antenna, microcontroller A itself and the system including the microcontroller A. In step n87, the microcontroller A changes to a recording process state. If the comparison result of the time a constant time before the recording programmed time stored in the information holding unit 4 and the current time shows that they do not match in step n84, the process proceeds to step n88, and the microcontroller A executes the power shutdown command and returns to the power shutdown mode of step n81.

According to the present embodiment, power consumption is greatly reduced by setting to the power shutdown mode rather than to the standby mode as in normal time when operation is not made until the recording programmed time in the recording device.

The examples of the present invention have been described, but various modifications may be made to the present invention based on the technical concept thereof.

While the invention has been particularly described with reference to the preferred embodiments thereof, it should be understood that combination and arrangement of the parts described in the preferred embodiments can be modified in various ways without departing from the spirit and the scope of the invention defined by the following claims.

What is claimed is:

1. A microcontroller comprising:
    a CPU;
    a power supply unit arranged between the CPU and a power supply device for supplying power to the CPU;
    a power supply control unit for controlling the CPU and the power supply unit;
    an information holding unit for holding information evacuated from the CPU, the information being necessary in proceeding with a program; and
    a clock generator; wherein:
    the power supply control unit outputs a shutdown request signal to the CPU in response to an occurrence of a power shutdown factor,
    the CPU, upon receiving the shutdown request signal, executes a power shutdown microprogram, evacuates the information necessary in proceeding with the program to the information holding unit, and outputs an evacuation completed signal to the power supply control unit after evacuation is completed,
    the power supply control unit, upon receiving the evacuation completed signal, outputs a power shutdown control signal to the power supply unit, the power supply unit shuts down power supply to the CPU upon receiving the power shutdown control signal from the power supply control unit, the power supply control unit, upon receiving the evacuation completed signal, outputs a clock stop control signal to the clock generator, the power supply control unit outputs a power supply control signal to the power supply unit in response to an occurrence of a power supply restoration factor, the power supply unit, upon receiving the power supply control signal, starts to supply power to the CPU, the power supply control unit outputs a restoration request signal to the CPU and outputs a clock supply control signal to the clock generator when a supplied power supply voltage is stabilized, the clock generator, upon receiving the clock supply control signal, restarts to supply an operation clock, and the CPU, upon receiving the restoration request signal, executes a power supply restoration microprogram, restores the information necessary in proceeding with the program and evacuated in the information holding unit in time of power shutdown, and then branches a process to an address indicated by a program counter to continue program execution from a shutdown state.

2. The microcontroller according to claim 1, wherein the clock generator selects one of operation performed after stopping supply of an operation clock and operation stop performed without stopping the supply of the operation clock as operation to be performed upon receiving the clock stop control signal from the power supply control unit.

3. The microcontroller according to claim 1, wherein the power supply control unit limits a period in which shutdown is possible.

4. The microcontroller according to claim 1, wherein the power shutdown microprogram evacuates the information necessary in proceeding with the program to a stack region in the information holding unit and then evacuates to a specific place only a value of a stack pointer for pointing to an evacuation place.

5. The microcontroller according to claim 1, wherein the power supply restoration factor uses an interrupt system of the microcontroller.

6. The microcontroller according to claim 1, wherein a state of the power shutdown factor includes at least one of a state where it is provided from an external terminal and a state where it is provided by a command, and it is possible to select a configuration corresponding to either one or both of the states.

7. The microcontroller according to claim 1, wherein:
the power supply restoration microprogram includes:
a microprogram for restoring the evacuated information necessary in proceeding with the program and proceeding with the program;
a microprogram for restoring a set value without using the evacuated information necessary in proceeding with the program; and
a program for resetting processes, and the CPU selects one of the plurality of microprograms in an alternative way.

8. The microcontroller according to claim 1, wherein one of the power shutdown microprogram and the power supply restoration microprogram is selectively executed in an alternative way, according to the generated power shutdown factor or a type of the selected power shutdown factor.

9. The microcontroller according to claim 1, wherein a period for shutting down power supply is set according to one or more peripheral circuit modules, and the period is set so that power shutdown is not carried out in a period necessary for power supply restoration and power shutdown is carried out in a period not necessary for the power supply restoration.

10. The microcontroller according to claim 1, further comprising a debugger for constantly monitoring a register in the CPU; wherein
data other than data monitored by the debugger is evacuated in the information holding unit in time of power shutdown.

11. The microcontroller according to claim 1, further comprising a second power supply unit for lowering a voltage to be supplied to a circuit portion outside a power shutdown range to a lower limit voltage for information holding when the power shutdown factor occurs.

12. The microcontroller according to claim 1, further comprising a circuit for loading an inverted value to a register in a circuit portion in a power shutdown range.

13. A communication device comprising:
the microcontroller according to claim 1;
an input unit for accepting an instruction to be externally input; and
a signal transmitting unit for transmitting a signal to other equipment by infrared light; wherein
a power shutdown process is executed when no input is made to the input unit for a constant time, and then a power supply restoration process is executed when an input is made to the input device.

14. A recording device comprising:
a DVD recorder LSI including the microcontroller according to claim 1, an image processing DSP, and a storage circuit; and
an optical disc controller LSI including a DSP servo; wherein
a timer interrupt is generated to the power supply control unit at every constant time, the current time and the time a constant time before a recording programmed time are compared, and a power supply restoration process is performed, when comparison result shows that the two match, in order for the microcontroller to change to a recording processable state.

15. The microcontroller of claim 1, wherein the power supply unit includes a voltage regulator.

16. The microcontroller of claim 1, wherein the power supply unit does not shut down the power supply at least to the clock generator upon receiving the power shutdown control signal from the power supply control unit.

17. A microcontroller comprising:
a CPU;
a power supply unit arranged between the CPU and a power supply device for supplying power to the CPU;
a power supply control unit for controlling the CPU and the power supply unit; and
an information holding unit for holding information evacuated from the CPU, the information being necessary in proceeding with a program; wherein:
the power supply control unit outputs a shutdown request signal to the CPU in response to an occurrence of a power shutdown factor,
the CPU, upon receiving the shutdown request signal, executes a power shutdown microprogram, evacuates the information necessary in proceeding with the program to the information holding unit, and outputs an evacuation completed signal to the power supply control unit after evacuation is completed, the power supply control unit, upon receiving an occurrence of a power supply restoration factor after receiving the evacuation completed signal, outputs a restoration request signal to the CPU, the CPU, upon receiving the restoration request signal, executes a power supply restoration mircoprogram which does not restore the evacuated information, and continues program execution, and the power shutdown microprogram evacuates the information necessary in proceeding with the program to a stack region in the information holding unit, and then evacuates to a specific place only a value of a stack pointer for pointing to an evacuation place.

18. The microcontroller according to claim 17, wherein the clock generator selects one of operation performed after stopping supply of an operation clock and operation stop performed without stopping the supply of the operation clock as operation to be performed upon receiving the clock stop control signal from the power supply control unit.

19. The microcontroller according to claim 17, wherein the power supply control unit limits a period in which shutdown is possible.

20. The microcontroller according to claim 17, wherein the power supply restoration factor uses an interrupt system of the microcontroller.

21. The microcontroller according to claim 17, wherein a state of the power shutdown factor includes at least one of a state where it is provided from an external terminal and a state where it is provided by a command, and it is possible to select a configuration corresponding to either one or both of the states.

22. The microcontroller according to claim 17, wherein the power supply restoration microprogram includes:
    a microprogram for restoring the evacuated information necessary in proceeding with the program and proceeding with the program;
    a microprogram for restoring a set value without using the evacuated information necessary in proceeding with the program; and
    a program for resetting processes, and
the CPU selects one of the plurality of microprograms in an alternative way.

23. The microcontroller according to claim 17, wherein one of the power shutdown microprogram and the power supply restoration microprogram is selectively executed in an alternative way, according to the generated power shutdown factor or a type of the selected power shutdown factor.

24. The microcontroller according to claim 17, wherein a period for shutting down power supply is set according to one or more peripheral circuit modules, and the period is set so that power shutdown is not carried out in a period necessary for power supply restoration and power shutdown is carried out in a period not necessary for the power supply restoration.

25. The microcontroller according to claim 17, further comprising a debugger for constantly monitoring a register in the CPU; wherein
    data other than data monitored by the debugger is evacuated in the information holding unit in time of power shutdown.

26. The microcontroller according to claim 17, further comprising a second power supply unit for lowering a voltage to be supplied to a circuit portion outside a power shutdown range to a lower limit voltage for information holding when the power shutdown factor occurs.

27. The microcontroller according to claim 17, further comprising a circuit for loading an inverted value to a register in a circuit portion in a power shutdown range.

28. A communication device comprising:
    the microcontroller according to claim 17;
    an input unit for accepting an instruction to be externally input; and
    a signal transmitting unit for transmitting a signal to other equipment by infrared light; wherein
    a power shutdown process is executed when no input is made to the input unit for a constant time, and then a power supply restoration process is executed when an input is made to the input device.

29. A recording device comprising:
    a DVD recorder LSI including the microcontroller according to claim 17, an image processing DSP, and a storage circuit; and
    an optical disc controller LSI including a DSP servo; wherein
    a timer interrupt is generated to the power supply control unit at every constant time, the current time and the time a constant time before a recording programmed time are compared, and a power supply restoration process is performed, when comparison result shows that the two match, in order for the microcontroller to change to a recording processable state.

30. The microcontroller of claim 17, wherein the power supply unit includes a voltage regulator.

31. The microcontroller of claim 17, wherein the power supply unit does not shut down the power supply at least to the clock generator upon receiving the power shutdown control signal from the power supply control unit.

* * * * *